(12) United States Patent
Ahn

(10) Patent No.: US 12,149,715 B2
(45) Date of Patent: *Nov. 19, 2024

(54) IMAGE DECODING METHOD/DEVICE, IMAGE ENCODING METHOD/DEVICE, AND RECORDING MEDIUM IN WHICH BITSTREAM IS STORED

(71) Applicant: INTELLECTUAL DISCOVERY CO., LTD., Seoul (KR)

(72) Inventor: Yong Jo Ahn, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,972

(22) Filed: Aug. 2, 2023

(65) Prior Publication Data

US 2024/0022740 A1  Jan. 18, 2024

Related U.S. Application Data

(63) Continuation of application No. 17/052,953, filed as application No. PCT/KR2019/005727 on May 13, 2019, now Pat. No. 11,758,159.

(30) Foreign Application Priority Data

May 14, 2018  (KR) .......................... 10-2018-0054880

(51) Int. Cl.
*H04N 19/18* (2014.01)
*H04N 19/105* (2014.01)
(Continued)

(52) U.S. Cl.
CPC ......... *H04N 19/186* (2014.11); *H04N 19/105* (2014.11); *H04N 19/11* (2014.11);
(Continued)

(58) Field of Classification Search
None
See application file for complete search history.

(56) References Cited

U.S. PATENT DOCUMENTS 8,804,827 B2  8/2014  Yang et al.
10,382,781 B2  8/2019  Zhao et al.
(Continued)

FOREIGN PATENT DOCUMENTS

CN  101742301 A  6/2010
EP  2 981 084 A1  2/2016
(Continued)

OTHER PUBLICATIONS

International Search Report of PCT/KR2019/005727 dated Aug. 28, 2019 [PCT/ISA/210].
(Continued)

*Primary Examiner* — Chikaodili E Anyikire
(74) *Attorney, Agent, or Firm* — Sughrue Mion, PLLC

(57) ABSTRACT

An image encoding/decoding method and device according to the present disclosure may configure a reference sample for a cross component prediction of a chroma component block, derive a cross component prediction parameter by using the reference sample, and make a cross component prediction of the chroma component block on the basis of the cross component prediction parameter and a luma component block corresponding to the chroma component block.

4 Claims, 19 Drawing Sheets

(51) Int. Cl.
*H04N 19/11* (2014.01)
*H04N 19/132* (2014.01)
*H04N 19/176* (2014.01)
*H04N 19/186* (2014.01)
*H04N 19/593* (2014.01)

(52) U.S. Cl.
CPC ......... *H04N 19/132* (2014.11); *H04N 19/176* (2014.11); *H04N 19/593* (2014.11)

(56) References Cited

U.S. PATENT DOCUMENTS

| | | |
|---|---|---|
| 10,455,249 B2 | 10/2019 | Zhang et al. |
| 10,484,712 B2 | 11/2019 | Zhang et al. |
| 11,095,921 B2 | 8/2021 | Zhao et al. |
| 2013/0336591 A1 | 12/2013 | Jeon et al. |
| 2016/0219283 A1 | 7/2016 | Chen et al. |
| 2016/0277762 A1 | 9/2016 | Zhang et al. |
| 2017/0105025 A1 | 4/2017 | Jeon et al. |
| 2017/0244975 A1 | 8/2017 | Huang et al. |
| 2017/0272749 A1 | 9/2017 | Pettersson et al. |
| 2017/0359595 A1 | 12/2017 | Zhang et al. |
| 2018/0048889 A1 | 2/2018 | Zhang et al. |
| 2018/0091825 A1 | 3/2018 | Zhao et al. |
| 2018/0146211 A1 | 5/2018 | Zhang et al. |
| 2018/0176594 A1 | 6/2018 | Zhang et al. |
| 2020/0007882 A1* | 1/2020 | Abe ...................... H04N 19/44 |
| 2020/0195930 A1 | 6/2020 | Choi et al. |
| 2021/0368165 A1 | 11/2021 | Choi et al. |

FOREIGN PATENT DOCUMENTS

| | | |
|---|---|---|
| KR | 10-2017-0071594 A | 6/2017 |
| KR | 10-2017-0120188 A | 10/2017 |
| KR | 10-2017-0129750 A | 11/2017 |
| WO | 2013/169049 A1 | 11/2013 |

OTHER PUBLICATIONS

Office Action dated Mar. 20, 2023 from the Chinese Patent Office in Application No. 201980031971.3.

* cited by examiner

IMAGE DECODING METHOD/DEVICE, IMAGE ENCODING METHOD/DEVICE, AND RECORDING MEDIUM IN WHICH BITSTREAM IS STORED

CROSS REFERENCE TO RELATED APPLICATIONS

This is a Continuation Application of U.S. application Ser. No. 17/052,953 filed Nov. 4, 2020, which is a National Stage of International Application No. PCT/KR2019/005727 filed May 13, 2019, which claims priority to Korean Patent Application No. 10-2018-0054880 filed May 14, 2018 of which the disclosures are incorporated herein by reference in their entireties.

TECHNICAL FIELD

The present disclosure relates to an image encoding/decoding method and apparatus. More specifically, it relates to an image decoding method/apparatus using cross component prediction and an image encoding method/apparatus corresponding thereto.

BACKGROUND ART

Video compression is largely composed of intra prediction, inter prediction, transform, quantization, entropy coding, in-loop filter. Meanwhile, as the demand for high-resolution images increases, the demand for 3D image contents as a new image service is also increasing. Discussion is underway on a video compression technique for effectively providing high-resolution and ultra-high-resolution images.

DISCLOSURE

Technical Problem

An object of the present disclosure is to provide an image encoding/decoding method and apparatus with improved efficiency.

In addition, an object of the present disclosure is to provide an image encoding/decoding method and apparatus with improved efficiency by introducing a cross component prediction technique during image encoding and decoding.

In addition, an object of the present disclosure is to provide an image encoding/decoding method and apparatus for performing prediction using a linear model based on similarity to a luma component or another chroma component of a chroma component of a current block.

In addition, an object of the present disclosure is to provide an image encoding/decoding method and apparatus that obtains a parameter of a linear model by using similarity between spatially adjacent pixels of a current block and applies it to cross component prediction.

In addition, an object of the present disclosure is to to provide an image encoding/decoding method and apparatus that obtains a cross component prediction parameter using some sample according to coding information among spatially adjacent samples of the current target block, and applies image encoding/decoding for cross component prediction for the chroma component of the current target block.

In addition, an object of the present disclosure is to provide a computer-readable recording medium storing a bitstream generated by the image encoding method/apparatus.

Technical Solution

An image encoding/decoding method and apparatus according to the present disclosure may construct a reference sample for cross component prediction, derive a cross component prediction parameter using the reference sample, and perform cross component prediction using the cross component prediction parameter.

In the image encoding/decoding method and apparatus according to the present disclosure, constructing the reference sample may use a pre-reconstructed sample spatially adjacent to a current reference component block and a current target component block.

In the image encoding/decoding method and apparatus according to the present disclosure, the pre-reconstructed sample may include a sample adjacent to at least one of a left or a top of the luma component block.

In the image encoding/decoding method and apparatus according to the present disclosure, the pre-reconstructed sample may further include a sample continuously located at a bottom of the sample adjacent to the left or a sample continuously located at a right of the sample adjacent to the top.

In the image encoding/decoding method and apparatus according to the present disclosure, the reference sample may be determined in consideration of at least one of a size of a current block, an intra prediction mode, or a constraint intra prediction. The current block may mean at least one of a current reference component block or a current target component block.

In the image encoding/decoding method and apparatus according to the present disclosure, when the shape of the current block is a square block, a reference sample may be constructed using both a sample adjacent to the top and a sample adjacent to the left among neighboring samples of the current block. On the other hand, when the shape of the current block is not a square block, a reference sample may be constructed using any one of a sample adjacent to the top or a sample adjacent to the left among neighboring samples of the current block.

In the image encoding/decoding method and apparatus according to the present disclosure, when a intra prediction mode of the current block is not the verticality modes (VER_MODES) and the horizontality modes (HOR_MODES), the reference sample may be constructed using both a sample adjacent to the top and a sample adjacent to the left among the adjacent sample of the current block. On the other hand, when the intra prediction mode of the current block is to the verticality modes (VER_MODES), the reference sample may be constructed using a sample adjacent to the top among the adjacent samples of the current block, and when the intra prediction mode of the current block is the horizontality modes (HOR_MODES), the reference sample may be constructed using a sample adjacent to the left among the adjacent samples of the current block.

In the image encoding/decoding method and apparatus according to the present disclosure, when the current block uses constraint intra prediction, the reference sample may be constructed with only a sample reconstructed with an intra prediction mode among spatially adjacent samples of the current block. On the other hand, when the current block does not use the constraint intra prediction, the reference sample may be constructed with all samples reconstructed with the inter prediction mode and the intra prediction mode among spatially adjacent samples of the current block.

In the image encoding/decoding method and apparatus according to the present disclosure, when the current block uses constraint intra prediction, the reference sample may be constructed only with samples reconstructed with an intra prediction mode among spatially adjacent samples of the current block, and in the case of the sample area reconstructed with the inter prediction mode, the reference sample may be constructed by performing padding based on an available sample among spatially adjacent samples of the current block.

In the image encoding/decoding method and apparatus according to the present disclosure, the reference sample may be constructed by performing padding based on an available sample among spatially adjacent samples of a current block.

In the image encoding/decoding method and apparatus according to the present disclosure, deriving the cross component prediction parameter may include extracting a maximum value and a minimum value among reference samples adjacent to the luma component block, and deriving the linear model based cross component prediction parameter by using the maximum value and the minimum value.

An image encoding/decoding method and apparatus according to the present disclosure, may further include downsampling the luma component block.

In the image encoding/decoding method and apparatus according to the present disclosure, the downsampling may be performed using a corresponding sample and a neighboring sample of the luma component block, and a number of the neighboring sample may be 1 or 5.

In the image encoding/decoding method and apparatus according to the present disclosure, the neighboring sample may include a sample adjacent to at least one of left, right, bottom, bottom left, or bottom right of the corresponding sample.

In the method and apparatus for encoding/decoding an image according to the present disclosure, the step of generating a cross component prediction signal may generate a prediction sample for the current target sample according to the linear model between a target sample in a current target component block and one or more sample in the thereto corresponding pre-reconstructed reference component block.

In the image encoding/decoding method and apparatus according to the present disclosure, the linear model used to generate the cross component prediction signal may perform cross component prediction based on at least one linear model using a distribution of sample values between two different components, and it is possible to use different linear models depending on the range of sample values.

A computer-readable recording medium according to the present disclosure is a computer-readable recording medium storing a bitstream generated by an image encoding method, the video encoding method may comprise constructing a reference sample for cross component prediction, deriving a cross component prediction parameter using the reference sample, and generating cross component prediction signal using the cross component prediction parameter.

Advantageous Effects

According to the present disclosure, an image encoding/decoding method and apparatus with improved efficiency as follows may be provided.

First, according to an embodiment of the present disclosure, an image decoding method and apparatus for improving encoding/decoding efficiency of a chroma component may be provided by utilizing a cross component prediction method.

Second, according to an embodiment of the present disclosure, an image decoding method and apparatus that improves encoding/decoding efficiency of a chroma component by using a prediction method based on a similarity between samples with a luma component or other chroma component for the chroma component of a current block may be provided.

Third, according to an embodiment of the present disclosure, an image decoding method and apparatus that improves encoding/decoding efficiency of chroma components by obtaining a parameter of a linear model applied to cross component prediction using the similarity of spatially adjacent samples of the current block may be provided.

Further, a computer-readable recording medium for storing a bitstream generated by the image encoding method/apparatus according to the present disclosure may be provided.

BEST MODE

Figure 1:
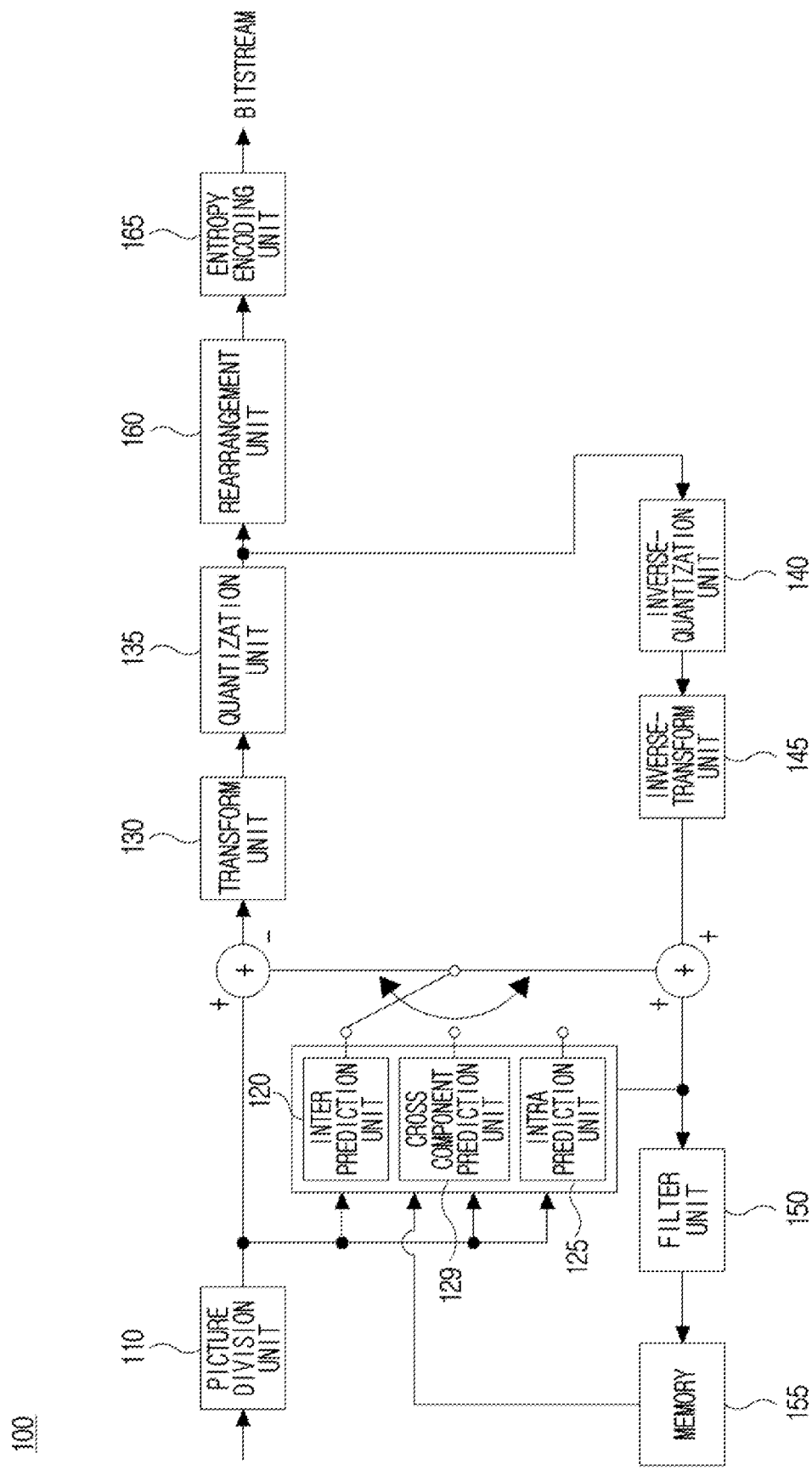
FIG. 1 is a block diagram showing an image encoding apparatus according to the present disclosure.

An image encoding/decoding method and apparatus according to the present disclosure may construct a reference sample for cross component prediction, derive a cross component prediction parameter using the reference sample, and perform cross component prediction using the cross component prediction parameter.

In the image encoding/decoding method and apparatus according to the present disclosure, constructing the reference sample may use a pre-reconstructed sample spatially adjacent to a current reference component block and a current target component block.

In the image encoding/decoding method and apparatus according to the present disclosure, the pre-reconstructed sample may include a sample adjacent to at least one of a left or a top of the luma component block.

In the image encoding/decoding method and apparatus according to the present disclosure, the pre-reconstructed sample may further include a sample continuously located at a bottom of the sample adjacent to the left or a sample continuously located at a right of the sample adjacent to the top.

In the image encoding/decoding method and apparatus according to the present disclosure, the reference sample may be determined in consideration of at least one of a size of a current block, an intra prediction mode of a current block, or whether a current block uses a constraint intra prediction. The current block may mean at least one of a current reference component block or a current target component block.

In the image encoding/decoding method and apparatus according to the present disclosure, when the shape of the current block is a square block, a reference sample may be constructed using both a sample adjacent to the top and a sample adjacent to the left among adjacent samples of the current block. On the other hand, when the shape of the current block is not a square block, a reference sample may be constructed using any one of a sample adjacent to the top or a sample adjacent to the left among adjacent samples of the current block.

In the image encoding/decoding method and apparatus according to the present disclosure, when a intra prediction mode of the current block is not the verticality modes (VER_MODES) and the horizontality modes (HOR_MODES), the reference sample may be constructed using both a sample adjacent to the top and a sample adjacent to the left among the adjacent samples of the current block. On the other hand, when the intra prediction mode of the current block is the verticality modes (VER_MODES), the reference sample may be constructed using a sample adjacent to the top among the adjacent samples of the current block, and when the intra prediction mode of the current block is the horizontality modes (HOR_MODES), the reference sample may be constructed using a sample adjacent to the left among the adjacent samples of the current block.

In the image encoding/decoding method and apparatus according to the present disclosure, when the current block uses constraint intra prediction, the reference sample may be constructed with only a sample reconstructed with an intra prediction mode among spatially adjacent samples of the current block. On the other hand, when the current block does not use the constraint intra prediction, the reference sample may be constructed with all samples reconstructed with the inter prediction mode and the intra prediction mode among spatially adjacent samples of the current block.

In the image encoding/decoding method and apparatus according to the present disclosure, when the current block uses constraint intra prediction, the reference sample may be constructed only with samples reconstructed with an intra prediction mode among spatially adjacent samples of the current block, and the sample area reconstructed with the inter prediction mode may be padded based on an available sample among spatially adjacent samples of the current block in order to construct the reference sample.

In the image encoding/decoding method and apparatus according to the present disclosure, the reference sample may be constructed by performing padding based on an available sample among spatially adjacent samples of a current block.

In the image encoding/decoding method and apparatus according to the present disclosure, deriving the cross component prediction parameter may include extracting a maximum value and a minimum value among reference samples adjacent to the luma component block, and deriving the linear model-based cross component prediction parameter by using the maximum value and the minimum value.

An image encoding/decoding method and apparatus according to the present disclosure, may further include downsampling the luma component block.

In the image encoding/decoding method and apparatus according to the present disclosure, the downsampling may be performed using a corresponding sample of the luma component block and a neighboring sample, and the number of neighboring samples may be 1, 2, 3, 4, 5, or more.

In the image encoding/decoding method and apparatus according to the present disclosure, the neighboring sample may include a sample adjacent to at least one of left, right, bottom, bottom-left, or bottom-right of the corresponding sample.

In the method and apparatus for encoding/decoding an image according to the present disclosure, the step of generating a cross component prediction signal may generate a prediction sample for the current target sample according to the linear model between a target sample in a current target component block and one or more samples in the pre-reconstructed reference component block corresponding thereto.

In the image encoding/decoding method and apparatus according to the present disclosure, the linear model used to generate the cross component prediction signal may perform cross component prediction based on at least one linear model using a distribution of sample values between two different components, and it is possible to use different linear models depending on the range of sample values.

A computer-readable recording medium according to the present disclosure is a computer-readable recording medium storing a bitstream generated by an image encoding method, the image encoding method may comprise constructing a reference sample for cross component prediction, deriving a cross component prediction parameter using the reference sample, and generating cross component prediction signal using the cross component prediction parameter.

MODE FOR DISCLOSURE

Embodiments of the present disclosure will be described in detail with reference to the accompanying drawings in the present specification so that those of ordinary skill in the art can easily implement the present disclosure. The present disclosure may, however, be embodied in many different forms and should not be construed as limited to the embodiments set forth herein. In order to clearly illustrate the present disclosure, parts not related to the description are omitted, and similar parts are denoted by like reference characters throughout the specification.

Throughout this specification, when a part is referred to as being 'connected' to another part, it includes not only an example where they are directly connected but also an example where the part is electrically connected with another part in between.

In addition, when a part is referred to as 'comprising' an element throughout the specification, it is understood that the element may include other elements as well, without departing from the other elements unless specifically stated otherwise.

In addition, in the embodiments of the apparatus and method described herein, some of the components of the apparatus or some of the steps of the method may be omitted. In addition, the order of some of the components of the apparatus or the order of some of the steps of the method may be changed. In addition, other components or other steps may be inserted in some of the components of the apparatus or in some of the steps of the method.

In addition, some of the components or steps of the first embodiment of the present disclosure may be added to the second embodiment of the present disclosure, or may replace some of the components or steps of the second embodiment.

In addition, the components shown in the embodiments of the present disclosure are shown independently to indicate different characteristic functions, and do not mean that each component is composed of separate hardware or one software component unit. That is, for convenience of description, each component is listed as each component, and at least two components of each component may be combined to form one component, or one component may be divided into a plurality of components to perform a function. The integrated and separated embodiments of each of these components are also included in the scope of the present disclosure without departing from the essence of the present disclosure.

First, the terms used in the present application will be briefly described as follows.

The decoding apparatus (Video Decoding Apparatus), which will be described later, may be a civil security camera, a civil security system, a military security camera, a military security system, a personal computer (PC), a notebook computer, a portable multimedia player (PMP), a wireless communication terminal, a smart phone, a apparatus included in a server terminal such as a TV application server and a service server, and may mean a user terminal such as various apparatus, a communication apparatus such as a communication modem for performing communication with a wired/wireless communication network, a memory for storing various programs and data for decoding an image or performing an inter prediction or intra prediction for decoding, various apparatus equipped with microprocessor, etc. for executing programs and calculating and controlling them.

In addition, an image encoded as a bitstream by an encoder may be transmitted to an image decoding apparatus through real-time or non-real-time wired/wireless communication networks such as the Internet, local area wireless communication networks, wireless LAN networks, WiBro networks, mobile communication networks, or through various communication interfaces such as cables, Universal Serial Bus (USB), etc., decoded, reconstructed as an image, and reproduced. Alternatively, the bitstream generated by the encoder may be stored in memory. The memory may include both volatile memory and non-volatile memory. In the present specification, the memory may be represented as a recording medium storing the bitstream.

In general, a video may be composed of a series of pictures, and each picture may be divided into a coding unit such as a block. In addition, a person with ordinary knowledge in the technical field to which this embodiment belongs may understand that the term 'a picture' described below may be used by replacing it with another term having an equivalent meaning such as 'an image' or 'a frame'. In addition, it will be understood by those of ordinary skill in the art to which this embodiment pertains that the term 'a coding unit' may be substituted for and used with other terms having the same meaning, such as 'a unit block' and 'a block'.

Hereinafter, exemplary embodiments of the present disclosure will be described in detail with reference to the accompanying drawings. In describing the present disclosure, redundant description of the same components will be omitted.

FIG. 1 is a block diagram showing an image encoding apparatus according to the present disclosure.

Referring to FIG. 1, the image encoding apparatus 100 includes a picture division unit 110, a prediction unit 120, 125, 129 a transform unit 130, a quantization unit 135, a rearrangement unit 160, and an entropy encoding unit 165, an inverse quantization unit 140, an inverse transform unit 145, a filter unit 150, and a memory 155.

The picture division unit 110 may divide the input picture into at least one processing unit. In this case, the processing unit may be a prediction unit (PU), a transform unit (TU), or a coding unit (CU). Hereinafter, in an embodiment of the present disclosure, a coding unit may be used as a meaning of a unit that performs encoding, or may be used as a meaning of a unit that performs decoding.

The prediction unit may be determined as one coding unit or may be split from the coding unit. The shape of the prediction unit may be square or rectangular. The divided prediction units may have the same size. Alternatively, one prediction unit among prediction units split within one coding unit may be split to have a different shape and/or size from another prediction unit. When intra prediction or inter prediction is performed based on the coding unit, the coding unit and the prediction unit may be the same. In this case, when the prediction unit is not the minimum coding unit, the prediction unit may be divided into N sub-blocks, and prediction may be performed in units of sub-blocks. Here, the value of N may be an integer of 1, 2, 3, 4 or more. The N value may be variably determined based on the property of the prediction unit. The attributes may mean at least one of a shape, asize, a prediction mode, whether the intra prediction mode is non-directional, the direction/value of an intra prediction mode, a size/shape of a transformation unit, a presence or absence of a residual coefficient, a transformation type (e.g., DCT, DST, etc.), or, whether to skip conversion.

The prediction units 120, 125 and 129 may include an inter prediction unit 120 that performs inter prediction, and an intra prediction unit 125 that performs intra prediction. Whether to use inter prediction or intra prediction for a prediction unit may be determined, and specific information (e.g., intra prediction mode, motion vector, reference picture, etc.) according to each prediction method may be determined.

The residual value (residual block) between the generated prediction block and the original block may be input to the transform unit 130. In addition, prediction mode information, motion vector information, and the like used for prediction may be encoded by the entropy encoding unit 165 together with the residual value and transmitted to the decoder. However, when the motion information derivation method of the decoder side according to the present disclosure is applied, the corresponding information is not transmitted to the decoder because the prediction mode information, motion vector information, and the like are not generated in the encoder. On the other hand, information indicating that the motion information is derived and used in the decoder side and information on a method used to derive the motion information may be signaled from the encoder.

In addition, it is possible to further perform cross component prediction separately from inter prediction or intra prediction. That is, the prediction unit may further include the aforementioned cross component predictor (129). In particular, the cross component prediction unit 129 may include a reference sample constructing unit for cross component prediction, a cross component prediction parameter deriving unit, and a cross component prediction performing unit. The cross component prediction unit may be implemented to be included in the intra prediction unit.

The inter prediction unit 120 may predict a prediction unit based on information of at least one of a previous picture or a subsequent picture of the current picture, and in some cases, predict a prediction unit based on information of some regions, which encoding has been completed, in the current picture. The inter prediction unit 120 may include a reference picture interpolation unit, a motion prediction unit, and a motion compensation unit.

The reference picture interpolation unit may receive reference picture information from the memory 155 and generate pixel information of an integer pixel or less in the reference picture. In the case of a luma pixel, a DCT-based 8-tap interpolation filter (DCT-based interpolation filter) having different filter coefficients may be used to generate pixel information of an integer pixel or less in units of a ¼ pixels. In case of a chroma signal, a DCT-based 4-tap interpolation filter (DCT-based interpolation filter) having different filter coefficients may be used to generate pixel information of an integer pixel or less in units of ⅛ pixels.

The motion prediction unit may perform motion prediction based on the reference picture interpolated by the reference picture interpolation unit. As a method for calculating the motion vector, various methods such as Full Search-based Block Matching Algorithm (FBMA), Three Step Search (TSS), and New Three-Step Search Algorithm (NTS) may be used. The motion vector may have a motion vector value in units of ½ or ¼ pixels based on the interpolated pixels. The motion prediction unit may predict a current prediction unit by differently using a motion prediction method. Various methods such as a skip method, a merge method, an AMVP (Advanced Motion Vector Prediction) method, and an intra block copy method may be used as the motion prediction method. In addition, when applying the motion information derivation method of the decoder side according to the present disclosure, a template matching method and a bidirectional matching (bilateral matching) method using a motion trajectory may be applied as methods performed by the motion prediction unit.

The intra prediction unit 125 may generate a prediction unit based on reference pixel information around a current block, which is pixel information in a current picture. When the neighboring block of the current prediction unit is a block that performs inter prediction and the reference pixel is a pixel that performs inter prediction, the reference pixel included in the block that performs inter prediction may be used by replacing it with reference pixel information of a block that performs intra prediction around it. That is, when the reference pixel is not available, the unavailable reference pixel information may be used by replacing with at least one reference pixel among the available reference pixels.

In addition, a residual block including residual information that is a difference value between the prediction unit that performs prediction based on the prediction units generated by the prediction units 120, 125 and 129 and the original block of the prediction unit may be generated. The generated residual block may be input to the transform unit 130.

The transform unit 130 may transform a residual block including residual information between a prediction unit generated by the prediction units 120, 125 and 129 and the original block by using the transform method such as DCT (Discrete Cosine Transform), DST (Discrete Sine Transform), and KLT. Whether DCT, DST, or KLT is applied to transform the residual block may be determined based on intra prediction mode information of a prediction unit used to generate the residual block.

The quantization unit 135 may quantize values transformed to the frequency domain by the transform unit 130. The quantization coefficient may vary depending on the block or the importance of the image. The value calculated by the quantization unit 135 may be provided to the inverse quantization unit 140 and the rearrangement unit 160.

The rearrangement unit 160 may perform the rearrangement of the coefficient value for the quantized residual value. The rearrangement unit 160 may change coefficients of 2-dimensional block form into 1-dimensional vector form through a coefficient scanning method. For example, the rearrangement unit 160 may change into a 1-dimensional vector form by scanning from a DC coefficient to a coefficient in a high frequency region according to a Zig-Zag Scan method. Depending on the size of the transform unit and the intra prediction mode, a vertical scan of scanning coefficients of two-dimensional block form in a column direction and a horizontal scan of scanning coefficients of two-dimensional block form in a row direction may be used instead of a zig-zag scan. That is, depending on the size of the transform unit and the intra prediction mode, it may be determined which one of a zigzag scan, a vertical scan, and a horizontal scan is used.

The entropy encoding unit 165 may perform entropy-encoding based on values calculated by the rearrangement unit 160. Various encoding methods, such as exponential Golomb, CAVLC (Context-Adaptive Variable Length Coding), and CABAC (Context-Adaptive Binary Arithmetic Coding), may be used for entropy-encoding. In relation to this, the entropy encoding unit 165 may encode residual value coefficient information of a coding unit from the rearrangement unit 160 and the prediction units 120 and 125. In addition, according to the present disclosure, information indicating that the motion information is derived and used in the decoder side and information on a method used to derive the motion information may be signaled from the encoder.

The inverse quantization unit 140 and the inverse transform unit 145 inverse-quantize the values quantized by the quantization unit 135 and inverse-transform the values transformed by the transform unit 130. The reconstructed block may be generated by combining the residual value generated by the inverse quantization unit 140 and the inverse transform unit 145 with the prediction unit predicted through the motion estimation unit, the motion compensation unit, and the intra prediction unit included in the prediction units 120 and 125.

The filter unit 150 may include at least one of a deblocking filter, an offset correction unit, and an adaptive loop filter (ALF). The deblocking filter may remove block distortion caused by boundary between blocks in the reconstructed picture. The offset correction unit may correct an offset from the original image in units of pixels for the deblocking-filtered image. In order to perform offset correction for a specific picture, after classifying the pixels included in the image into a certain number of regions and determining the region to which the offset is applied, a method of applying the offset to the region offset or a method of applying the offset by considering edge information of each pixel may be used. ALF (Adaptive Loop Filtering) may be performed based on a value obtained by comparing a filtered reconstructed image with an original image. After classifying the pixels included in the image into a predetermined group, one filter to be applied to the group may be determined to perform filtering differently for each group.

The memory 155 may store the reconstructed block or picture output from the filter unit 150, and the stored reconstructed block or picture may be provided to the prediction units 120 and 125 when performing inter prediction.

Figure 2:
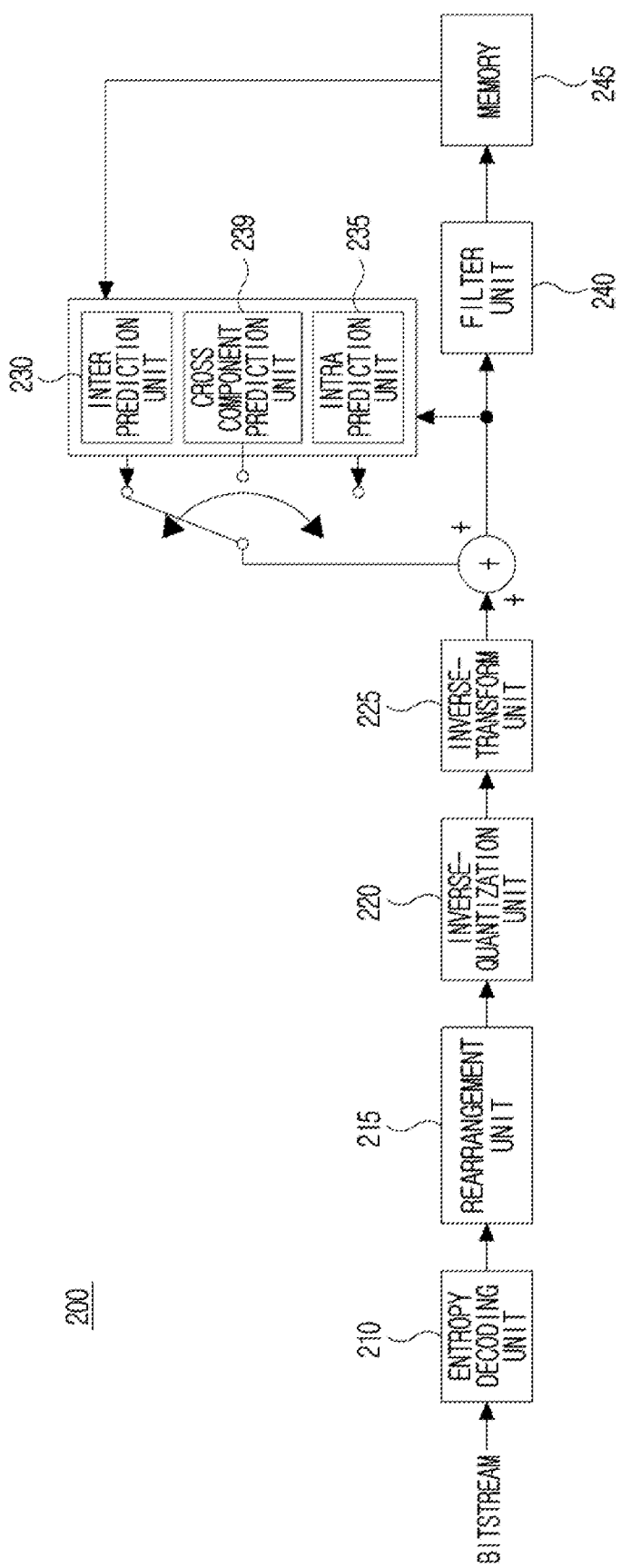
FIG. 2 is a block diagram showing an image decoding apparatus according to the present disclosure.

FIG. 2 is a block diagram showing an image decoding apparatus according to the present disclosure.

Referring to FIG. 2, the image decoder 200 may include an entropy decoding unit 210, a rearrangement unit 215, an inverse quantization unit 220, an inverse transform unit 225, a prediction unit 230, 235, 239, and a filter unit 240, a memory 245.

When an image bitstream is input from the image encoder, the input bitstream may be decoded in a procedure opposite to that of the image encoder.

The entropy decoding unit 210 may perform entropy-decoding in a procedure opposite to that performed by entropy-encoding in the entropy encoding unit of the image encoder. For example, various methods corresponding to the method performed in the image encoder such as Exponential Golomb (CAVLC), Context-Adaptive Variable Length Coding (CAVLC), and Context-Adaptive Binary Arithmetic Coding (CABAC) may be applied.

The entropy decoding unit 210 may decode information related to intra prediction and inter prediction performed by the encoder.

The rearrangement unit 215 may perform rearrangement of the bitstream entropy-decoded by the entropy decoding unit 210 based on a rearrangement method of the encoding unit. The coefficients of a 1-dimensional vector form may be rearranged into coefficients of a 2-dimensional block form again.

The inverse quantization unit 220 may perform inverse quantization based on the quantization parameter provided by the encoder and the coefficients of the rearranged block.

The inverse transform unit 225 may perform inverse transform, that is, inverse DCT, inverse DST, and inverse KLT, corresponding to transforms performed by the transform unit, that is, DCT, DST, and KLT for the quantization results performed by the image encoder. The inverse transform may be performed based on the transmission unit determined by the image encoder. In the inverse transform unit 225 of the image decoder, a transform type (for example, DCT, DST, KLT) may be selectively performed according to a plurality of information such as a prediction method, a size of a current block, and a prediction direction. Alternatively, the inverse transform unit 225 may determine a transform type based on information identifying the transform type and perform an inverse transform using the determined transform type. Information for identifying the transformation type may be signaled by an image encoder.

The prediction units 230, 235 and 239 may generate a prediction block based on prediction block generation related information provided by the entropy decoding unit 210 and previously decoded block or picture information provided by the memory 245.

As described above, when a size of the prediction unit and a size of the transform unit are the same in performing intra prediction in the same manner as in the image encoder, the intra prediction of the prediction unit may be performed based on pixels located on the left, the top-left and the top of the prediction unit. However, when the size of the prediction unit and the size of the transform unit are different in performing intra prediction, the intra prediction may be performed using a reference pixel based on the transform unit. In addition, the intra prediction using sub-block division may be used only for the minimum coding unit.

The prediction units may include at least one of a prediction unit determination unit, an inter prediction unit 230, an intra prediction unit 235 or cross component prediction unit 239. The prediction unit determination unit may receive various information from the entropy decoding unit 210 such as prediction unit information, prediction mode information of an intra prediction method, and motion prediction related information of an inter prediction method, classify the prediction unit from the current coding unit, and determine whether the prediction unit performs inter prediction or intra prediction. On the other hand, if the motion prediction related information for the inter prediction is not transmitted, and instead, information indicating that the motion information is derived and used in the decoder side and information about a method used to derive the motion information is transmitted from the encoder 100, the prediction unit determination unit determines the prediction performance of the inter prediction unit 230 based on the information transmitted from the encoder 100.

The inter prediction unit 230 may perform inter prediction for a current prediction unit based on information included in at least one of a previous picture or a subsequent picture of the current picture including the current prediction unit, by using information required for inter prediction of the current prediction unit provided by the image encoder. In order to perform inter prediction, a motion prediction method of a prediction unit included in a coding unit may be determined among a skip mode, a merge mode, an AMVP mode, and an intra block copy mode. Alternatively, the inter prediction unit 230 may perform inter prediction by deriving motion information from information indicating that the motion information is derived and used in the decoder side and information on a method used to derive the motion information, provided by the image encoder.

The intra prediction unit 235 may generate a prediction block based on pixel information in the current picture. When the prediction unit is a prediction unit that has performed intra prediction, intra prediction may be performed based on intra prediction mode information of a prediction unit provided by an image encoder. The intra prediction unit 235 may include an adaptive intra smoothing (AIS) filter, a reference pixel interpolation unit, and a DC filter. The AIS filter is a part that performs filtering on the reference pixel of the current block and may be applied by determining whether to apply the filter according to the prediction mode of the current prediction unit. AIS filtering may be performed on a reference pixel of a current block by using prediction mode and AIS filter information of a prediction unit provided by an image encoder. When the prediction mode of the current block is a mode that does not perform AIS filtering, the AIS filter may not be applied.

When the prediction mode of the prediction unit is the prediction unit that performs intra prediction based on the pixel value obtained by interpolating the reference pixel, the reference pixel interpolation unit may interpolate the reference pixel to generate a reference pixel of an integer pixel or less. When the prediction mode of the current prediction unit is a prediction mode in which a prediction block is generated without interpolating a reference pixel, the reference pixel may not be interpolated. The DC filter may generate a prediction block through filtering when the prediction mode of the current block is the DC mode.

In addition, it is possible to further perform cross component prediction separately from inter prediction or intra prediction. That is, the prediction unit may further include the cross component prediction unit 239 described above. Alternatively, the cross component prediction unit 239 may be implemented to be included in the intra prediction unit 235. In particular, the cross component prediction unit 239 may include a reference sample constructing unit for cross component prediction, a cross component prediction parameter derivation unit, and a cross component prediction performing unit, as described above for cross component prediction.

The reconstructed block or picture may be provided to the filter unit 240. The filter unit 240 may include a deblocking filter, an offset correction unit, and an ALF.

Information about whether a deblocking filter is applied to a corresponding block or picture and information about whether a strong filter is applied or a weak filter is applied in applying the deblocking filter may be provided from a video encoder. In the deblocking filter of the video decoder, information related to the deblocking filter provided by the video encoder may be provided, and the video decoder may perform deblocking filtering on the corresponding block.

The offset correction unit may perform offset correction on the reconstructed image based on a type of offset correction and offset value information applied to the image during encoding. ALF may be applied to a coding unit based on information on whether to apply ALF, ALF coefficient information, and the like, provided by an encoder. This ALF information may be provided from a specific parameter set.

The memory 245 may store the reconstructed picture or block so that it can be used as a reference picture or a reference block, and may also provide the reconstructed picture to an output unit.

Figure 3:
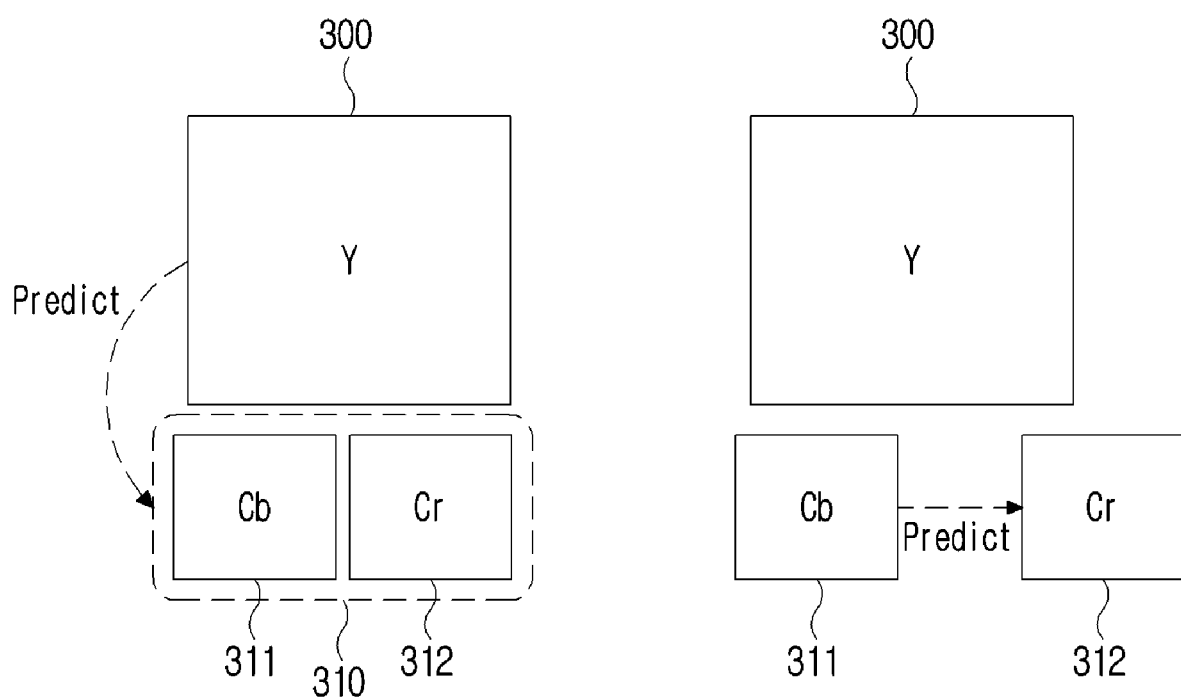
FIG. 3 illustrates a concept of a cross component prediction technique according to the present disclosure.

FIG. 3 illustrates a concept of a cross component prediction technique according to the present disclosure. The cross component prediction technology refers to a technology for improving coding efficiency through prediction between a luma component and a chroma component constituting a video picture. Specifically, a chroma component may be predicted from a luma component and then the difference value may be signaled, or a chroma component may be predicted from another chroma component and then the difference value may be signaled. Alternatively, it may be a method of signaling a parameter used for cross component prediction and reconstructing a cross component prediction signal using the parameter.

In relation to this, FIG. 3 illustrates one luma component block constituting one block and two chroma component blocks corresponding thereto.

Referring to FIG. 3, two chroma component blocks may be predicted from one luma component block, or the other one chroma component block of the two chroma component blocks may be predicted from one of the two chroma component blocks.

In FIG. 3, one luma component block 300 configuring one block and two chroma component blocks 310 corresponding thereto are shown. According to an embodiment of the present disclosure, the pixel characteristics of the luma component block 300 and the pixel characteristics of the chroma component blocks 310 configuring one block may be expressed in a linear model. In this case, as the linear model, as in Equation 1, a first-order linear model may be used.

$$PRE_C(i,j) = \alpha \cdot REC'_L(i,j) + \beta \qquad \text{[Equation 1]}$$

In Equation 1, $PRE_C(i,j)$ denotes a predicted pixel of a chroma component, and $REC'_L(i,j)$ denotes a reconstructed pixel of a luma component in a linear model.

Figure 4:
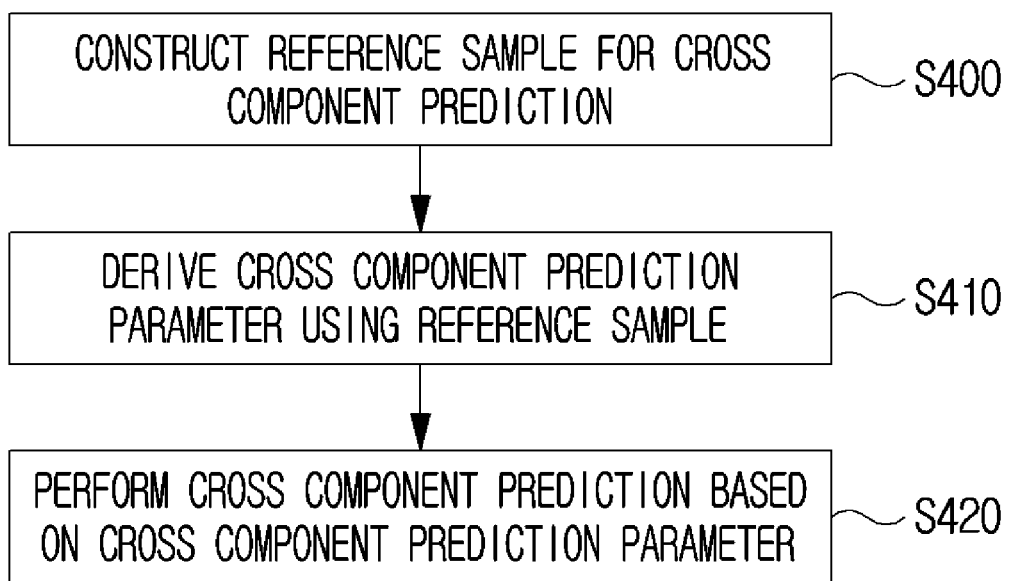
FIG. 4 is a flowchart illustrating a cross component prediction according to the present disclosure.

FIG. 4 is a flowchart illustrating a cross component prediction according to the present disclosure.

Referring to FIG. 4, a reference sample for cross component prediction may be constructed (S400).

The reference sample may be constructed using a sample spatially adjacent to a current reference component block and/or a current target component block. The reference sample may be constructed according to one or more conditions. In this case, the condition may be at least one of a size of a current block, an intra prediction mode of the current block, or whether a constraint intra prediction is applied. Here, the current block may mean a current reference component block and/or the current target component block. A method of constructing a reference sample will be described later in detail with reference to FIGS. 5 to 13.

Referring to FIG. 4, a cross component prediction parameter may be derived using a reference sample (S410).

In order to perform cross component prediction based on the linear model, the parameters of the linear model may be derived. The cross component prediction parameter based on the linear model may be derived using all or part of the reference sample constructed in S400.

When the cross component prediction proposed in the present disclosure is used, the following two methods may be used as a method of obtaining the parameters α and β of the linear model applied to Equation 1. However, the present disclosure is not necessarily limited thereto, and it is possible to utilize the parameters α and β in various ways.

First, there is a method of directly transmitting α and β, which are parameters of the linear model, from an encoder to a decoder. In the case of applying the first method, since the encoder obtains α and β parameters, and transmits them through signaling, the decoder does not need to separately obtain α and β parameters. It should be considered that the complexity of the decoder is reduced, while the encoder's coding efficiency is low.

Second, a method of deriving by using the same method in an encoder and a decoder may be used by using spatially adjacent pixels of the luma component block and the chroma component blocks of the current block. When the second method is applied, since both the encoder and the decoder derive α and β parameters according to a predetermined rule or standard method, the decoder complexity is relatively increased, but additional signaling is not required for the parameter. There is an advantage in that the efficiency of the encoding and the decoding is further improved than before.

According to the second method, when the α and β parameters are derived using samples spatially adjacent to a luma component block and/or a chroma component block in an encoder and a decoder, the α and β parameters may be derived as the following equations 2 and 3.

$$\alpha = \frac{N \cdot \sum(L(n) \cdot C(n)) - \sum L(n) \cdot \sum C(n)}{N \cdot \sum(L(n) \cdot L(n)) - \sum L(n) \cdot \sum L(n)} \quad \text{[Equation 2]}$$

$$\beta = \frac{\sum C(n) - \alpha \cdot \sum L(n)}{N} \quad \text{[Equation 3]}$$

In Equations 2 and 3, L(n) denotes a down-sampled luma sample, and C(n) denotes a chroma sample.

As described above, the remaining chroma component blocks may be predicted from one of the chroma component blocks. For example, in case of a prediction sample of a CR chroma component constituting one block, an inter-chroma prediction method modified using a residual signal of a CB chroma component may be used. In this case, the prediction sample of the CR chroma component may be modified as shown in Equation 4 below.

$$PRE_{CR}^*(i,j) = PRE_{CR}(i,j) + \alpha \cdot RES'_{CB}(i,j) \quad \text{[Equation 4]}$$

In Equation 4, $PRE_{CR}(i,j)$ denotes a prediction sample of the CR chroma component, and $RES'_{CB}(i,j)$ denotes a residual signal of the CR chroma component.

α in Equation 4 may be derived using samples spatially adjacent to the CB chroma component block and/or the CR chroma component block of the current block. For example, α may be derived as in Equation 5 below.

[Equation 5]

$$\alpha = \frac{N \cdot \sum(Cb(n) \cdot Cr(n)) - \sum Cb(n) \cdot \sum Cr(n) + \lambda \cdot (-0.5)}{N \cdot \sum(Cb(n) \cdot Cr(n)) - \sum Cb(n) \cdot \sum Cb(n) + \lambda)}$$

In Equation 5, Cb(n) denotes a CB chroma sample, and Cr(n) denotes a CR chroma sample. In addition, λ denotes Σ(Cb(n)*Cb(n))>>9.

However, the present disclosure is not limited to the above-described Equations 1 to 4, and in the same manner, it is possible to derive the parameters by calculating the slope and the offset of the linear model based on the linear model.

Specifically, the maximum value (xL1) and the minimum value (xL2) may be extracted from the luma reference samples adjacent to the current reference component block, respectively. Sample values yC1 and yC2 of the chroma reference samples respectively corresponding to the maximum and minimum luma reference samples may be derived.

A linear model-based parameter may be derived using the maximum/minimum values (xL1, xL2) of the luma reference sample and sample values (yC1, yC2) of the chroma reference sample. For example, based on the linear model, the slope α and the offset β may be derived from a straight line passing through the first point (xL1,yC1) and the second point (xL2,yC2).

Conversely, a maximum value (xC1) and a minimum value (xC2) may be extracted from the chroma reference samples adjacent to the current target component block, respectively. Sample values yL1 and yL2 of the luma reference samples respectively corresponding to the maximum value and minimum value of chroma reference samples may be derived. Similarly, a linear model-based parameter may be derived using the maximum/minimum values (xC1, xC2) of the chroma reference sample and sample values (yL1, yL2) of the luma reference sample.

Meanwhile, the maximum value may be determined using the upper p samples among the reference samples. The minimum value may be determined using the lower q samples of the reference samples. For example, the maximum value may be determined as an average value, a median value, a maximum value, or a most frequent value of the upper p samples. The minimum value may be determined as an average value, a median value, a minimum value, or a most frequent value of the lower q samples. Here, p may be the same as q or may be set differently from q. p and q may be 2, 3, 4, or more integers.

The p value may be a fixed value pre-defined in the encoding/decoding apparatus (Embodiment 1).

Alternatively, the p value may be variably determined based on the size of the current block (Embodiment 2). Specifically, when the width of the current block is larger than a predetermined threshold size, p may be determined to be a larger value compared to the other case. For example, when the width of the current block is larger than a predetermined threshold size, p may be determined as 2 or 3, otherwise, p may be determined as 1. Likewise, when the height of the current block is larger than a predetermined threshold size, p may be determined to be a larger value compared to the other case.

Alternatively, the p value may be variably determined based on the shape of the current block (Embodiment 3). For example, depending on whether the current block is a square, the p value may be determined differently as shown in table 1 below.

TABLE 1

| Square | 1 | 1 | 2 | 2 | 3 | 3 |
| Non-square | 2 | 3 | 3 | 1 | 1 | 2 |

Alternatively, the encoding apparatus may encode the optimal p value and signal it to the decoding apparatus, and the decoding apparatus may determine the p value using the signaled information (Embodiment 4).

The p value may be determined based on any one of the above-described embodiments 1 to 4, or the p value may be determined based on a combination of at least two of the embodiments 1 to 4. The value of q may be determined in the same manner as that of p, and a detailed description will be omitted. However, it is not limited thereto, and of course, q may be determined in an embodiment different from p.

Referring to FIG. 4, cross component prediction may be performed based on a current reference component block and a cross component prediction parameter (S420).

The target sample may be predicted according to a linear model between the target sample in the current target component block and the sample in the pre-reconstructed reference component block corresponding thereto.

In this case, the number and position of samples in the reference component block corresponding to the current target sample may be variably determined. The information on the number and position may be signaled by an encoding apparatus or may be derived based on predetermined encoding information in a decoding apparatus. The number and position of samples in the reference component block corresponding to the current target sample will be described with reference to FIGS. 14 to 18.

Figure 5:
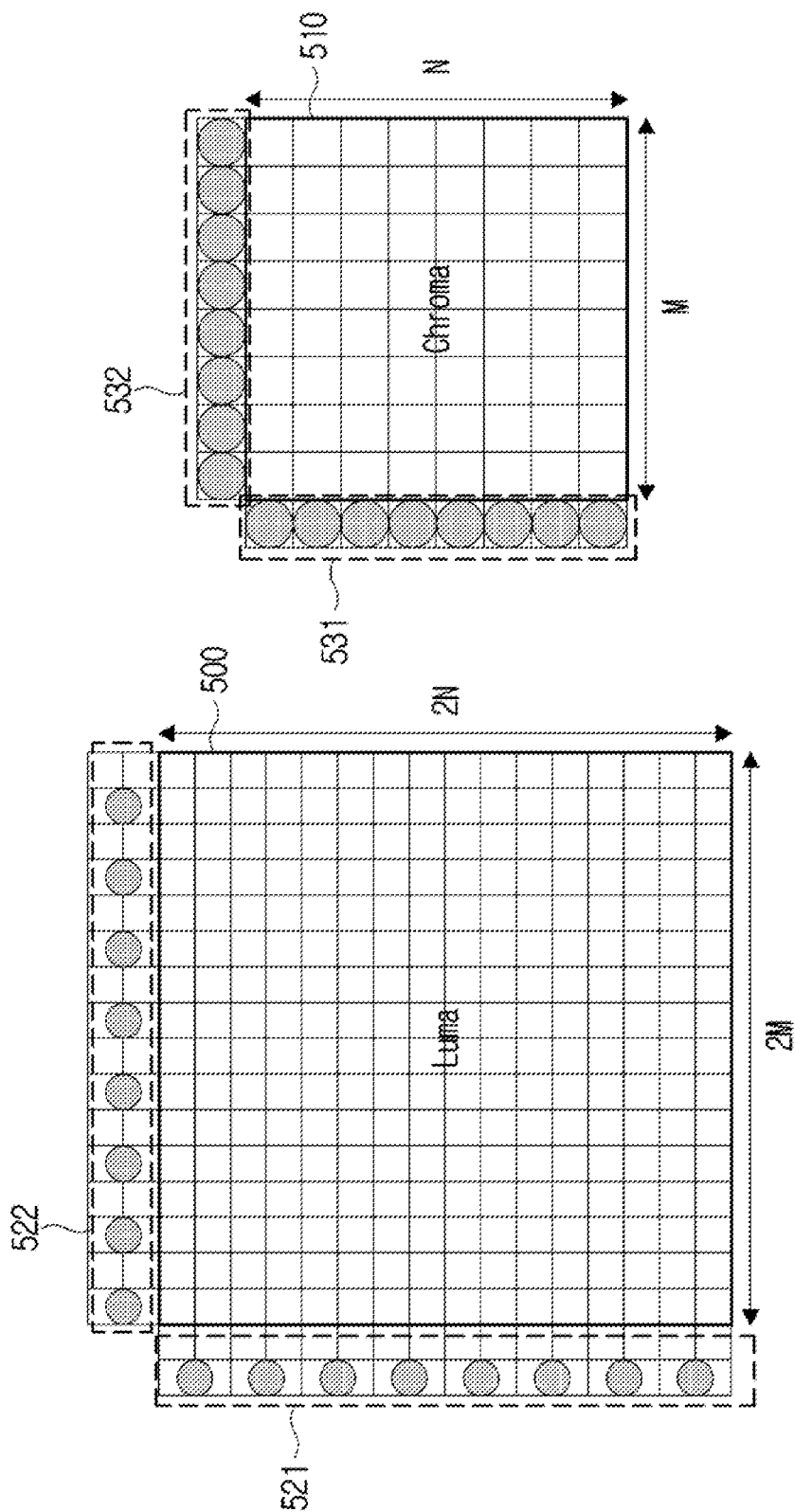
FIG. 5 illustrates a construction example of a reference sample for cross component prediction as an embodiment according to the present disclosure.

FIG. 5 illustrates a construction example of a reference sample for cross component prediction as an embodiment according to the present disclosure.

Specifically, FIG. 5 illustrates a construction of a sample spatially adjacent to a current luma component block and a sample spatially adjacent to a chroma component block performing cross component prediction.

FIG. 5 shows an embodiment of a case where the color format of the current picture is YUV 4:2:0. According to the color format of the current picture, the sample positions of the luma components corresponding to the sample of chroma components for cross component prediction may be different.

In performing cross component prediction using the luma component block 500 of the current block, a reconstructed sample spatially adjacent to the luma component block 500 of the current block may be composed of a left neighboring sample 521 and/or a top neighboring sample 522. In addition, reconstructed samples that are spatially adjacent to the chroma component block 510 of the current block may be composed of a left neighboring sample 531 and/or a top neighboring sample 532 as shown in FIG. 5.

The reconstructed samples spatially adjacent to the luma component block 500 and the chroma component block 510 of the current block illustrated in FIG. 5 may further include samples continuously located to the right of the top neighboring sample 522 and 532, and, may further include samples continuously located to the bottom of the left neighboring samples 521 and 531.

In this embodiment, it is assumed that the chroma component block has a size of (nTbW×nTbH), and a luma component block corresponding to the chroma component block has a size of (2*nTbW×2*nTbH).

The luma component block may be defined as a region including samples pY[x][y] (x=0 ... nTbW*2−1, y=0 ... nTbH*2−1). The sample may mean a reconstructed value before the in-loop filter is applied.

A reconstructed sample spatially adjacent to the luma component block (hereinafter, referred to as a neighboring region) may include at least one of a left neighboring region, a top neighboring region, or a top-left neighboring region. The left neighboring region may be set as a region including samples pY[x][y] (x=−1 ... −3, y=0 ... 2*numSampL−1). The setting may be performed only when the value of numSampL is greater than 0. The top neighboring region may be set as a region including samples pY[x][y] (x=0 ... 2*numSampT−1, y=−1 ... −2). The setting may be performed only when the value of numSampT is greater than 0. The top-left neighboring region may be set as a region including samples pY[x][y] (x=−1, y=−1, −2). The above setting may be performed only when the top-left area of the luma component block is available.

The variables numSampL and numSampT may be determined based on an intra prediction mode of a chroma component block.

For example, when the intra prediction mode of the chroma component block is a first mode (e.g., INTRA_LT_CCLM), numSampL and numSampT may be respectively determined based on the height and width of the chroma component block. Here, the first mode may mean a mode in which cross component prediction is performed based on left and top neighboring regions of the chroma component block. For example, numSampL and numSampT may be derived as in Equation 6 below.

numSampT=availT?nTbW:0 numSampL=availL?nTbH: 0         [Equation 6]

According to Equation 6, numSampT may be derived as nTbW when the top neighboring region of the chroma component block is available, otherwise may be derived as 0. Similarly, numSampL may be derived as nTbH when the left neighboring region of the chroma component block is available, otherwise may be derived as 0.

On the other hand, when the intra prediction mode of the chroma component block is a second mode (e.g., INTRA_T_CCLM) or a third mode (INTRA_L_CCLM), it may be derived as in Equation 7 below. Here, the second mode may mean a mode in which cross component prediction is performed based on a top neighboring region of the chroma component block. The third mode may mean a mode in which cross component prediction is performed based on a left neighboring region of the chroma component block.

numSampT=(availT &&
    predModeIntra==INFRA_$T$_CCLM)?(nTbW+
    numTopRight):0 numSampL=(availL &&
    predModeIntra==INTRA_$L$_CCLM)?(nTbH+
    numLeftBelow):0         [Equation 7]

In Equation 7, nTbW may mean the number of samples belonging to a region adjacent to the top of the chroma component block, and numTopRight may mean the number of available samples continuously located to the right of the region adjacent to the top. In this case, the determination of availability is sequentially determined whether a sample is available from left to right, and this may be performed until an unusable sample is found. nTbH may mean the number of samples belonging to a region adjacent to the left side of the chroma component block, and numLeftBelow may mean the number of available samples continuously located bottom of the region adjacent to the left side. In this case, the determination of availability is sequentially determined whether a sample is available from top to bottom, and this may be performed until an unusable sample is found.

A reference sample for the luma component block may be determined by downsampling a neighboring region of the luma component block, and a detailed description of the downsampling method will be given below.

1. Downsampling of Left Neighboring Region of Luma Component Block

Embodiment 1

The downsampled sample pLeftDsY[y] (y=0 ... numSampL−1) of the left neighboring region may be derived based on the corresponding sample pY[−2][2*y] of the left neighboring region and the neighboring sample. Here, the neighboring sample may mean a sample adjacent to at least one of the left, right, top, or bottom of the corresponding sample. For example, the sample pLeftDsY[y] may be derived as in Equation 8 below.

$$pLeftDsY[y]=(pY[-2][2*y-1]+pY[-3][2*y]+4*pY[-2][2*y]+pY[-1][2*y]+pY[-2][2*y+1]+4)>>3 \quad [\text{Equation 8}]$$

However, if the top-left neighboring region of the luma component block is not available, the downsampled sample pLeftDsY[0] of the left neighboring region may be derived based on the corresponding sample pY[-2][0] of the left neighboring region and the neighboring sample. Here, the neighboring sample may mean a sample adjacent to at least one of the left or right of the corresponding sample. For example, the sample pLeftDsY[0] may be derived as in Equation 9 below.

$$pLeftDsY[0]=(pY[-3][0]+2*pY[-2][0]+pY[-1][0]+2)>>2 \quad [\text{Equation 9}]$$

Embodiment 2

The downsampled sample pLeftDsY[y] (y=0 . . . numSampL-1) of the left neighboring region may be derived based on the corresponding sample pY[-2][2*y] of the left neighboring region and the neighboring sample. Here, the neighboring sample may mean a sample adjacent to at least one of the bottom, left, right, bottom-left, or bottom-right of the corresponding sample. For example, the sample pLeftDsY[y] may be derived as in Equation 10 below.

$$pLeftDsY[y]=(pY[-1][2*y]+pY[-1][2*y+1]+2*pY[-2][2*y]+2*pY[-2][2*y+1]+pY[-3][2*y]+pY[-3][2*y+1]+4)>>3 \quad [\text{Equation 10}]$$

Likewise, downsampling of the left neighboring region may be performed based on any one of Embodiments 1 and 2 described above. In this case, either of the Embodiment 1 or 2 may be selected based on a predetermined flag. The flag may indicate whether the downsampled luma sample has the same position as the original luma sample. For example, when the flag is the first value, the downsampled luma sample has the same position as the original luma sample. On the other hand, when the flag is the second value, the downsampled luma sample has the same position in the horizontal direction as the original luma sample, but has a position shifted by a half pel in the vertical direction.

Meanwhile, downsampling for the left neighboring region may be performed only when the numSampL value is greater than 0. When the numSampL value is greater than 0, it may mean that the left neighboring region of the luma component block is available and the intra prediction mode of the chroma component block is the first mode or the third mode.

2. Downsampling of Top Neighboring Area of Luma Component Block

Embodiment 1

The downsampled sample pTopDsY[x] (x=0 . . . numSampT-1) of the top neighboring region may be derived in consideration of whether the top neighboring region belongs to a different coding tree unit (CTU) from the luma component block. CTU may mean a maximum coding unit pre-defined in an encoding/decoding apparatus.

When the top neighboring region belongs to the same CTU as the luma component block, the downsampled sample pTopDsY[x] of the top neighboring region is derived based on the corresponding sample pY[2*x][-2] of the top neighboring region and the neighboring sample. Here, the neighboring sample may mean a sample adjacent to at least one of the left, right, top, or bottom of the corresponding sample. For example, the sample pTopDsY[x] may be derived as in Equation 11 below.

$$pTopDsY[x]=(pY[2*x][-3]+pY[2*x-1][-2]+4*pY[2*x][-2]+pY[2*x+1][-2]+pY[2*x][-1]+4)>>3 \quad [\text{Equation 11}]$$

On the other hand, when the top neighboring region belongs to a CTU different from the luma component block, the downsampled sample pTopDsY[x] of the top neighboring region may be derived based on the corresponding sample pY[2*x][-1] of the top neighboring region and the neighboring sample. Here, the neighboring sample may mean a sample adjacent to at least one of the left or right of the corresponding sample. For example, the sample pTopDsY[x] may be derived as in Equation 12 below.

$$pTopDsY[x]=(pY[2*x-1][-1]+2*pY[2*x][-1]+pY[2*x+1][-1]+2)>>2 \quad [\text{Equation 12}]$$

Alternatively, when the top-left neighboring region of the luma component block is not available, the neighboring sample may mean a sample adjacent to at least one of the top or bottom of the corresponding sample. For example, the sample pTopDsY[0] may be derived as in Equation 13 below.

$$pTopDsY[0]=(pY[0][-3]+2*pY[0][-2]+pY[0][-1]+2)>>2 \quad [\text{Equation 13}]$$

Alternatively, when the top-left neighboring region of the luma component block is not available and the top neighboring region belongs to a CTU different from the luma component block, the sample pTopDsY[0] may be set to the sample pY[0][-1] of the top neighboring region.

Embodiment 2

The downsampled sample pTopDsY[x] (x=0 . . . numSampT-1) of the top neighboring region may be derived in consideration of whether the top neighboring region belongs to a CTU different from the luma component block.

When the top neighboring region belongs to the same CTU as the luma component block, the downsampled sample pTopDsY[x] of the top neighboring region may be derived based on the corresponding sample pY[2*x][-2] of the top neighboring region and the neighboring sample. Here, the neighboring sample may mean a sample adjacent to at least one of the bottom, left, right, bottom-left, or bottom-right of the corresponding sample. For example, the sample pTopDsY[x] may be derived as in Equation 14 below.

$$pTopDsY[x]=(pY[2*x-1][-2]+pY[2*x-1][-1]+2*pY[2*x][-2]+2*pY[2*x][-1]+pY[2*x+1][-2]+pY[2*x+1][-1]+4)>>3 \quad [\text{Equation 14}]$$

On the other hand, when the top neighboring region belongs to a CTU different from the luma component block, the downsampled sample pTopDsY[x] of the top neighboring region may be derived based on the corresponding sample pY[2*x][-1] of the top neighboring region and the neighboring sample. Here, the neighboring sample may mean a sample adjacent to at least one of the left or right of the corresponding sample. For example, the sample pTopDsY[x] may be derived as in Equation 15 below.

$$pTopDsY[x]=(pY[2*x-1][-1]+2*pY[2*x][-1]+pY[2*x+1][-1]+2)>>2 \quad [\text{Equation 15}]$$

Alternatively, when the top-left neighboring region of the luma component block is not available, the neighboring sample may mean a sample adjacent to at least one of the top or bottom of the corresponding sample. For example, the sample pTopDsY[0] may be derived as in Equation 16 below.

$$pTopDsY[0]=(pY[0][-2]+pY[0][-1]+1)>>1 \quad \text{[Equation 16]}$$

Alternatively, when the top-left neighboring region of the luma component block is not available and the top neighboring region belongs to a CTU different from the luma component block, the sample pTopDsY[0] may be set to the sample pY[0][-1] of the top neighboring region.

Likewise, downsampling of the top neighboring region may be performed based on any one of Embodiments 1 and 2 described above. In this case, either of the Embodiment 1 or 2 may be selected based on a predetermined flag. The flag indicates whether the downsampled luma sample has the same position as the original luma sample, as described above.

Meanwhile, downsampling for the top neighboring region may be performed only when the numSampT value is greater than 0. When the numSampT value is greater than 0, it may mean that the top neighboring region of the luma component block is available and the intra prediction mode of the chroma component block is the first mode or the second mode.

Figure 6:
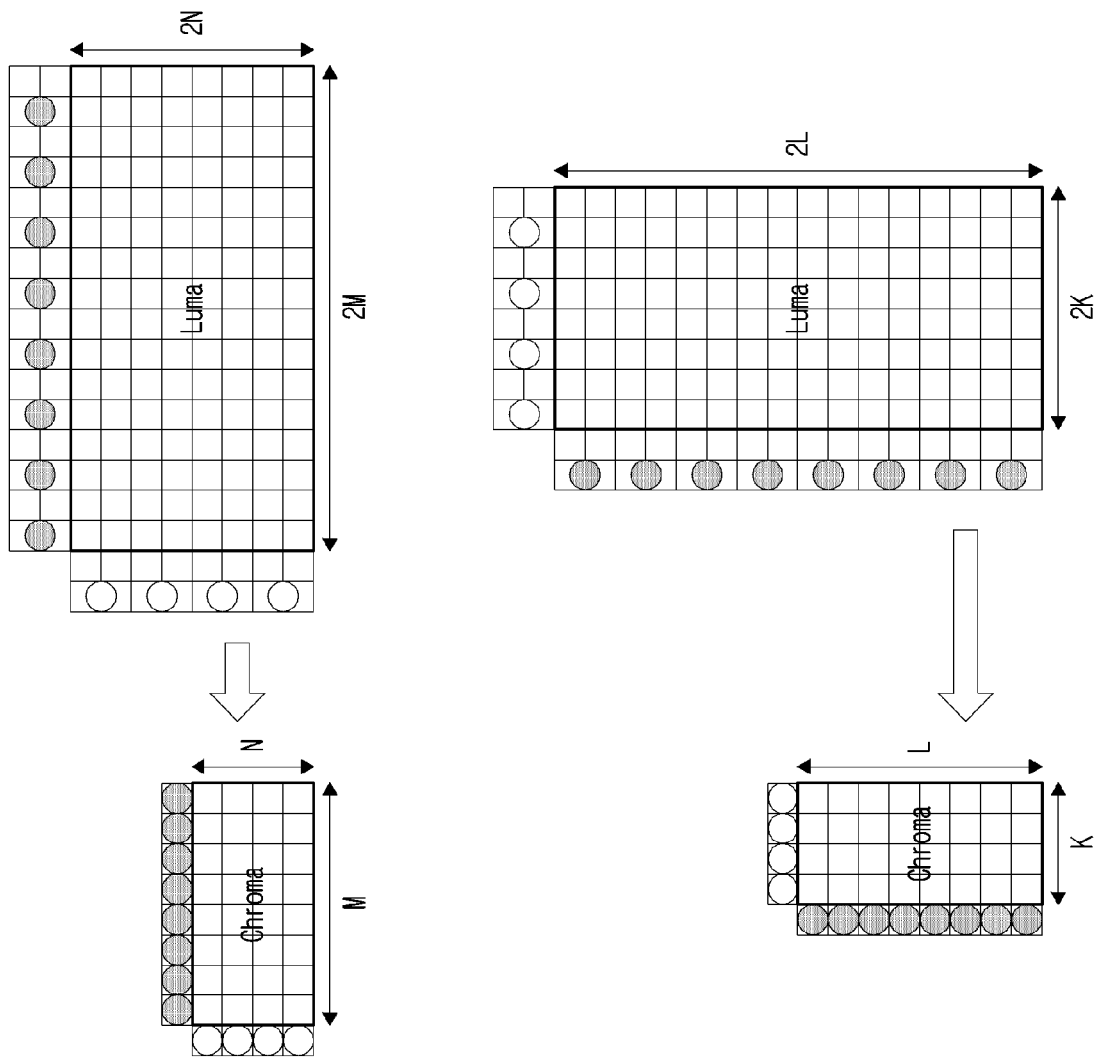
FIG. 6 illustrates an example in which neighboring samples of a current block used for deriving a linear model parameter for cross component prediction are constructed differently according to coding information, as an embodiment according to the present disclosure.

FIG. 6 illustrates an example in which neighboring samples of a current block used for deriving a linear model parameter for cross component prediction are constructed differently according to coding information, as an embodiment according to the present disclosure.

Specifically, FIG. 6 shows an example in which spatially adjacent samples of a current luma component block and spatially adjacent samples of a chroma component block performing cross component prediction are configured differently according to coding information of the current block. Here, the linear model parameter for cross component prediction may be derived using the same method in the encoder and the decoder.

FIG. 6 shows examples of different construction of spatially adjacent samples used to derive linear model parameters for cross component prediction according to coding information of a current block. The coding information of the current block may refer to information such as an intra prediction mode of a current block, a size of a current block, a color format of a current picture, etc. Here, the current block may mean a luma component block and/or a chroma component block.

For example, in FIG. 6, when the current chroma block performing cross component prediction is constructed as an M×N block and M is greater than N (M>N), the reference sample used for deriving a parameter of a linear model for cross component prediction may be constructed using only a sample located on the top of the luma block.

In addition, in FIG. 6, when the current chroma block performing cross component prediction is constructed as a block of K×L, and L is greater than K (L>K), the reference sample used for deriving a parameter of a linear model for cross component prediction may be constructed using only a sample located to the left of the luma block.

Figure 7:
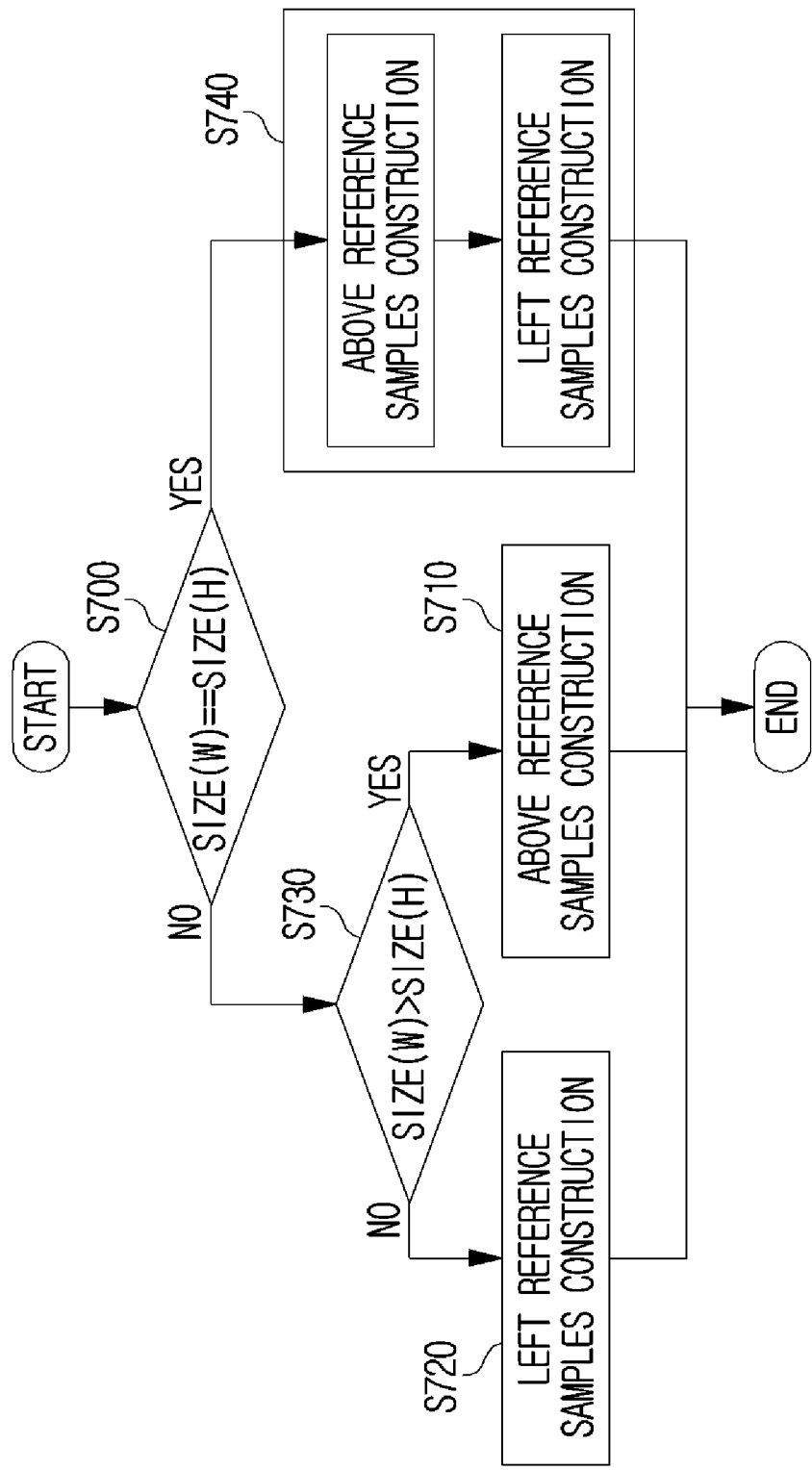
FIG. 7 is a flowchart in which adjacent samples of a current block used for deriving a linear model parameter for cross component prediction are constructed differently according to a shape of a target block, as an embodiment according to the present disclosure.

FIG. 7 is a flowchart in which adjacent samples of a current block used for deriving a linear model parameter for cross component prediction are constructed differently according to a shape of a target block, as an embodiment according to the present disclosure.

Specifically, FIG. 7 illustrates a flowchart that is constructed differently according to the shape of the target component block in constructing a sample spatially adjacent to a target component block and a reference component block used to derive a linear model parameter for cross component prediction. Here, the linear model parameter for cross component prediction may be derived using the same method in the encoder and the decoder.

According to the embodiment of FIG. 7, depending on whether the target block is a square block, a rectangular block having a width W greater than a height H, or a rectangular block having a height H greater than the width W, reference samples for deriving linear parameters for cross component prediction may be differently constructed.

Specifically, referring to FIG. 7, it is first determined whether the shape of the target block is a square block (S700). If it is not a square block, it is determined whether it is a non-square block having the width W greater than the height H (S730). In step S700, when the shape of the target block is determined to be a square block, a reference sample may be constructed using a sample adjacent to the top and a sample adjacent to the left among adjacent samples of the current block used to derive a linear model parameter for cross component prediction (S740).

In addition, when it is determined in step S730 that the block width W of the target block is greater than the block height H, that is, in the case of a non-square block having a long width, the reference sample may be constructed using only the sample adjacent to the top (S710). In addition, when it is determined in step 730 that the block width (W) of the target block is less than the block height (H), that is, in the case of a non-square block having a long height, the reference sample may be constructed using only the sample adjacent to the left (S720).

However, in the above embodiments, it was described the case of a non-square block having a long width, in which only a sample adjacent to the top is used, and the case of a non-square block having a long height, in which only a sample adjacent to the left is used. However, it may also include the case of a non-square block having a long width, in which some of the sample adjacent to the top and/or the sample adjacent to the left is used, and the case of a non-square block having a long height, in which some of the sample adjacent to the left and/or the sample adjacent to the top is used.

The above embodiments describe an embodiment of a method of differently constructing the reference sample used for deriving a linear parameter for cross component prediction according to the shape of the target block proposed in the present disclosure, and they may also include a method of using only some of the samples adjacent to the top or only some of the samples adjacent to the left, depending on the shape of the target block, the size of the target block, the intra prediction mode, or whether the constraint intra prediction is performed.

Figure 8:
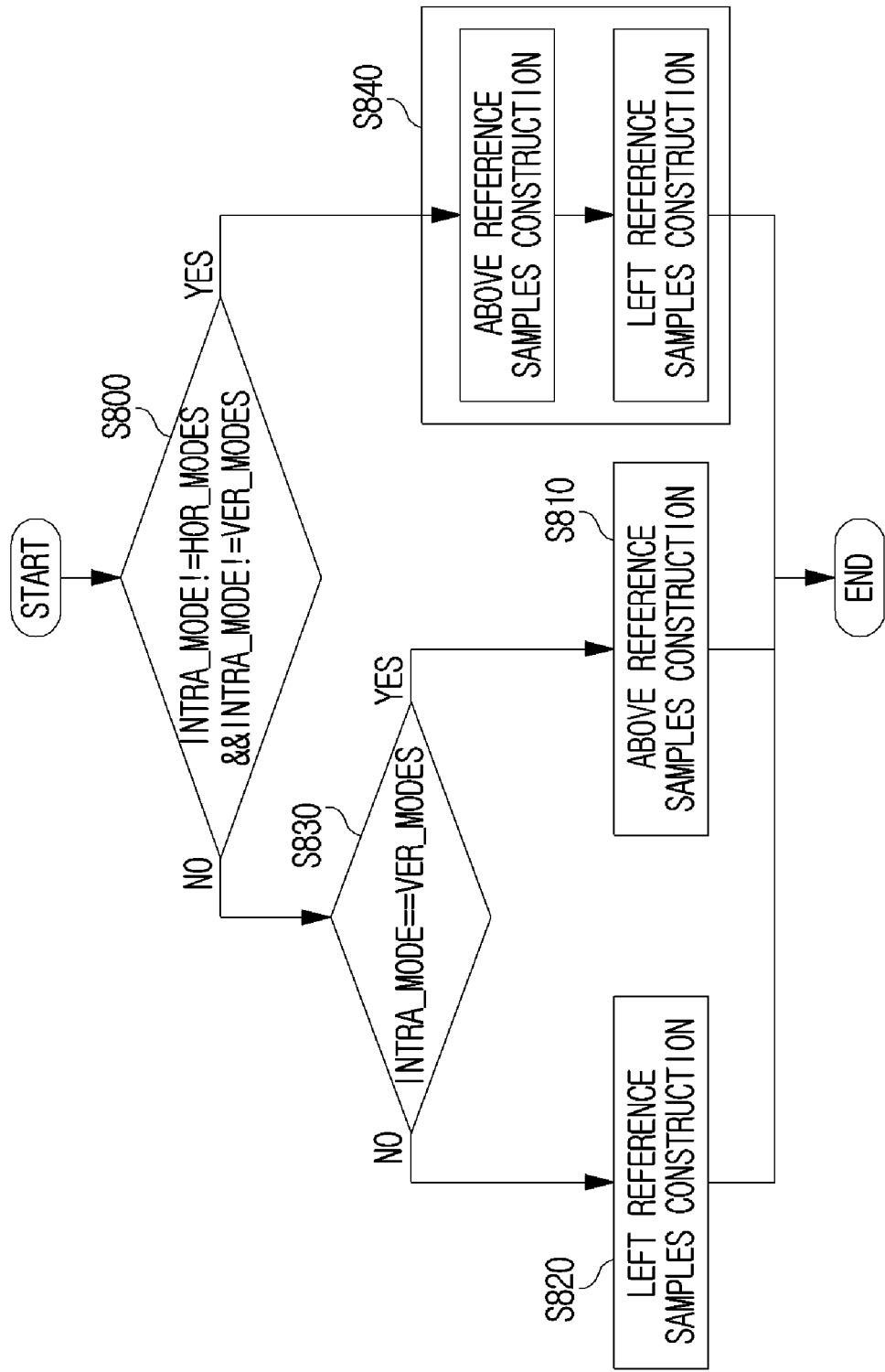
FIG. 8 is a flowchart in which adjacent samples of a current block used to derive a linear model parameter for cross component prediction are constructed differently according to an intra prediction mode of the current block, as an embodiment according to the present disclosure.

FIG. 8 is a flowchart in which adjacent samples of a current block used to derive a linear model parameter for cross component prediction are constructed differently according to an intra prediction mode of the current block, as an embodiment according to the present disclosure.

First, a method of determining an intra prediction mode of a current block will be described. Here, the current block is a concept including a luma component block and a chroma component block, and the intra prediction mode may be determined for each of a luma component block and a chroma component block. Hereinafter, it is assumed that the intra prediction mode pre-defined in the decoding apparatus is composed of non-directional modes (Planar mode, DC mode) and 65 directional modes.

The intra prediction mode of the luma component block may be derived based on the MPM list and the MPM index.

The MPM list may include a plurality of MPMs, and the MPM may be determined based on an intra prediction mode of a neighboring block of the current block. The number of MPMs is r, and r may be an integer of 3, 4, 5, 6, or more.

For example, the MPM list may include at least one of an intra prediction mode of a neighboring block (modeA), (modeA−n), (modeA+n), or a default mode. The n value may be an integer of 1, 2, 3, 4 or more. The neighboring block may mean a block adjacent to the left and/or the top of the current block. The default mode may be at least one of a planar mode, a DC mode, or a predetermined directional mode. The predetermined directional mode may include at least one of a horizontal mode (modeV), a vertical mode (modeH), (modeV−k), (modeV+k), (modeH−k), or (modeH+k).

The MPM index may specify the same MPM as the intra prediction mode of the luma component block among MPMs in the MPM list. That is, the MPM specified by the MPM index may be set as the intra prediction mode of the luma component block.

The intra prediction mode of the chroma component block may be derived as shown in Table 2 or 3 below based on information (intra_chroma_pred_mode) signaled by the encoding apparatus.

mode82, and mode83, the second mode may be another one of mode81, mode82, or mode83, and the third mode may be other mode except for the first mode and the second mode.

The intra prediction mode of the current block is determined through the above-described method, and a reference sample for cross component prediction may be constructed based on the determined intra prediction mode.

Referring to FIG. 8, reference samples for deriving linear model parameters for cross component prediction may be constructed differently according to the intra prediction mode of the reference component block. Here, the reference sample may be constructed using a sample spatially adjacent to the target component block and the reference component block. Here, the linear model parameter for cross component prediction may be derived using the same method in the encoder and the decoder.

According to the embodiment of FIG. 8, the reference sample for deriving the linear parameter for cross component prediction may be constructed differently according to whether the intra prediction mode of the reference component block is modes having verticality (VER_MODES), modes having horizontality (HOR_MODES), and/or remaining modes. The direction of the intra prediction mode will be described with reference to FIG. 9.

TABLE 2

| | IntraPredModeY[ xCb + cbWidth / 2 ][ yCb + cbHeight / 2 ] | | | | |
|---|---|---|---|---|---|
| intra_chroma_pred_mode[ xCb ][ yCb ] | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

According to Table 2, the intra prediction mode of the chroma component block may be determined based on the signaled information and the intra prediction mode of the luma component block. In Table 2, mode66 may mean a diagonal mode in the top-right direction, mode50 may mean a vertical mode, mode18 may mean a horizontal mode, and mode1 may mean a DC mode. For example, when the value of the signaled information intra_chroma_pred_mode is 4, the intra prediction mode of the chroma component block may be set to be the same as the intra prediction mode of the luma component block.

TABLE 3

| | IntraPredModeY[ xCb + cbWidth / 2 ][ yCb + cbHeight / 2 ] | | | | |
|---|---|---|---|---|---|
| intra_chroma_pred_mode[ xCb ][ yCb ] | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

Table 3 may be applied when cross component prediction is allowed for a chroma component block. Table 3 supports mode81, mode82, and mode83 as intra prediction modes of a chroma component block, which correspond to modes indicating cross component prediction. For example, the above-described first mode may be any one of mode81, Specifically, referring to FIG. 8, it is determined whether the intra prediction mode of the reference component block is not included in the modes having verticality (VER_MODES) and not included in the modes having horizontality (HOR_MODES) (S800). As a result of the determination in step S800, when it corresponds to none of the verticality modes (VER_MODES) and the horizontality modes (HOR_MODES), the reference sample is constructed using all of the samples adjacent to the top and left among the samples adjacent to the current block used to derive the linear model parameter for cross component prediction (S840).

On the other hand, in step S800, when it is determined that it corresponds to either of the verticality modes (VER_MODES) or the horizontality modes (HOR_MODES), it is determined whether it corresponds to the verticality modes (VER_MODES) or the horizontality modes (HOR_MODES) (S830).

If, as a result of the determination at S830, when the intra prediction mode of the reference component block is included in the modes having verticality (VER_MODES), the reference sample is constructed using only the sample adjacent to the top among the samples adjacent to the current block (S810).

On the other hand, as a result of determining S830, when the intra prediction mode of the reference component block is included in the modes having horizontality (HOR_MODES), the reference sample is constructed using only the sample adjacent to the left among the samples adjacent to the current block (S820).

However, in the above embodiments, it was described the case of verticality modes, in which only a sample adjacent to the top is used, and the case of horizontality modes, in which only a sample adjacent to the left is used. However, it may also include the case of verticality modes using some samples among the samples adjacent to the left and/or the samples adjacent to the top, and the case of horizontality modes, using some samples among the samples adjacent to the left and/or the samples adjacent to the top.

The above embodiments describe an embodiment of a method of differently constructing a reference sample used for deriving a linear parameter for cross component prediction according to an intra prediction mode of a reference component block proposed in the present disclosure, and they may also include a method of using only some of the samples adjacent to the top or only some of the samples adjacent to the left according to the shape of the target block, the size of the target block, the intra prediction mode, and whether or not the constraint intra prediction is performed. The above-described embodiment may be applied in the same/similar manner to the intra prediction mode of the target component block.

Figure 9:
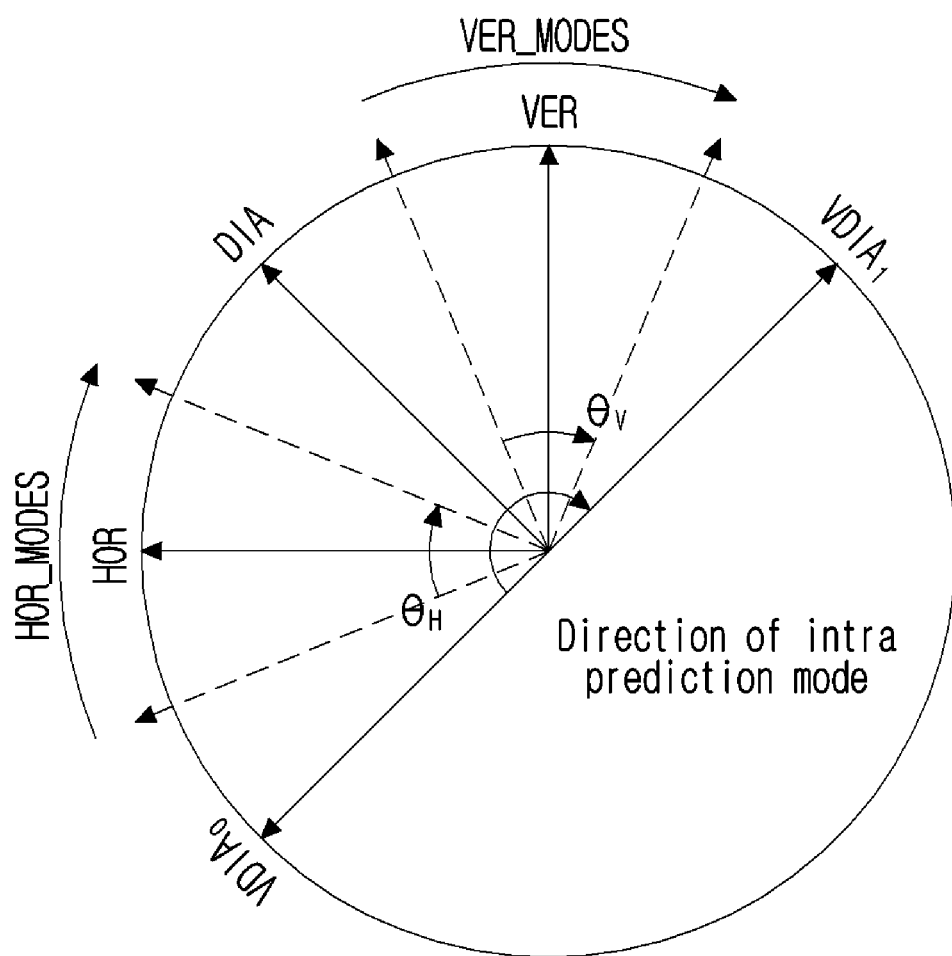
FIG. 9 illustrates a directionality of an intra prediction mode as an embodiment to which the present disclosure is applied.

FIG. 9 illustrates a directionality of an intra prediction mode as an embodiment to which the present disclosure is applied.

Specifically, FIG. 9 is a diagram for explaining in more detail the concept of a mode having horizontality (HOR_MODES) and a mode having verticality (VER_MODES) according to the directionality of the intra prediction mode.

Referring to FIG. 9, There are representative modes of the intra prediction mode consisting of a horizontal mode (HOR), a top-left diagonal mode (DIA), a vertical mode (VER), and a top-right diagonal mode (VDIA1) according to the increase of the angle from the bottom-left diagonal mode (VDIA0). In particular, a plurality of directional modes exists between the bottom-left diagonal mode (VDIA0) and the top-right diagonal mode (VDIA1) at regular intervals. In this case, the number of intra prediction modes having the directionality may be 32, 65, 129, or the etc.

The mode (HOR_MODES) having horizontality described in the present disclosure refers to one or more intra prediction modes that are included within a range of a certain angle (θH) based on the horizontal mode (HOR). In this case, θH refers to a certain angle not exceeding |ang(VDIA0)−ang(DIA)|, and may be different depending on the size of a block and the number of intra prediction modes available for the current block.

The mode having verticality (VER_MODES) described in the present disclosure refers to one or more intra prediction modes that are included within a range of a certain angle (θV) based on the vertical mode (VER). In this case, θV refers to a certain angle that does not exceed |ang(VDIA1)−ang(DIA)|, and may be different depending on the size of a block and the number of intra prediction modes available to the current block.

Figure 10:
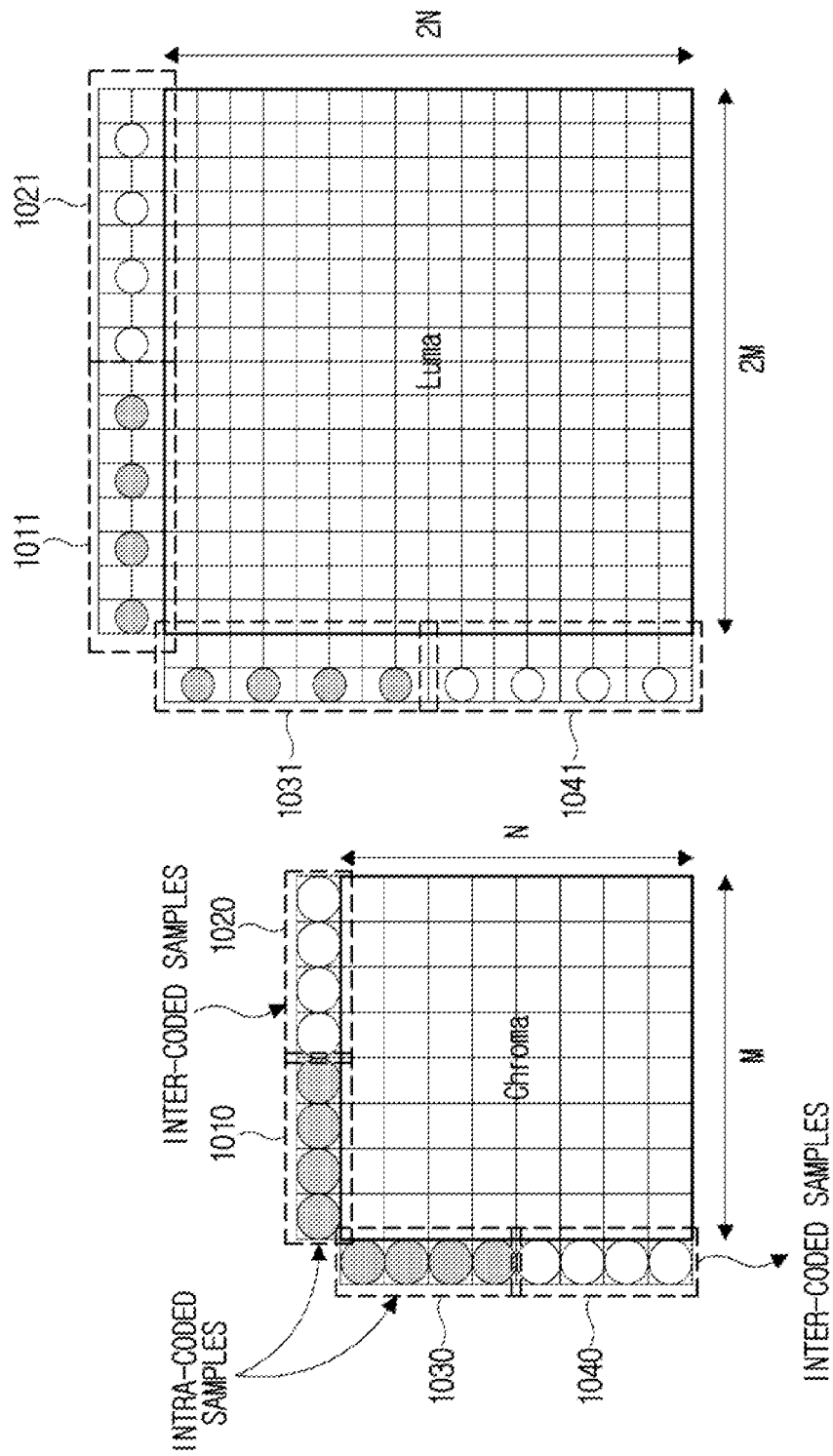
FIG. 10 illustrates an example according to the present disclosure in which adjacent samples of a current block used to derive a linear model parameter for cross component prediction are constructed differently depending on whether the constraint intra prediction is performed.

FIG. 10 illustrates an example according to the present disclosure in which adjacent samples of a current block used to derive a linear model parameter for cross component prediction are constructed differently depending on whether the constraint intra prediction is performed. Specifically, FIG. 10 shows an example of differently constructing depending on whether the constraint intra prediction is performed in constructing samples spatially adjacent to a target component block and a reference component block used to derive a linear model parameter for cross component prediction. Here, the linear model parameter for cross component prediction may be derived using the same method in the encoder and the decoder.

FIG. 10 is a diagram illustrating an embodiment of constructing a reference sample for deriving a linear model parameter for cross component prediction by reflecting whether constraint intra prediction proposed by the present disclosure is performed. That is, in constructing a reference sample using spatially adjacent samples of the current block for cross component prediction, the reference samples may be differently constructed according to whether the constraint intra prediction is performed.

For example, in the case of using constraint intra prediction, the reference sample is constructed using only samples 1010, 1030, 1011, 1031 reconstructed in intra prediction mode among samples spatially adjacent to the current block in order to derive a linear model parameter for cross component prediction, and the parameters of the linear model are derived. That is, in the case of using constraint intra prediction, samples 1020, 1040, 1021, and 1041 reconstructed in inter prediction mode among samples spatially adjacent to the current block are excluded in order to derive a linear model parameter for cross component prediction, and the reference sample is constructed with only samples 1010, 1030, 1011, and 1031 reconstructed in the intra prediction mode, and parameters of the linear model are derived.

Figure 11:
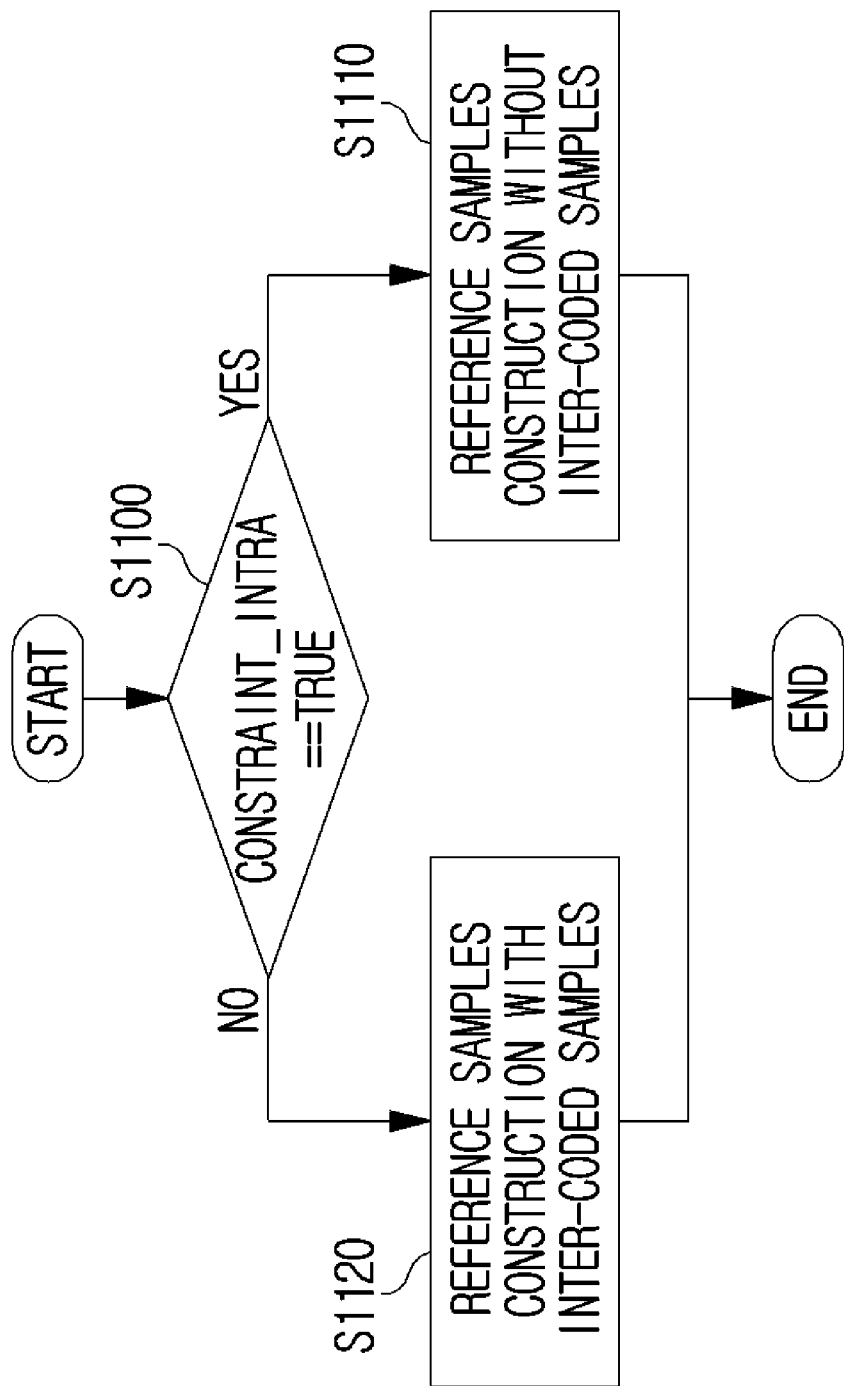
FIG. 11 is a flowchart in which a sample adjacent to a current block used to derive a linear model parameter for cross component prediction is constructed differently depending on whether the constraint intra prediction is performed, as embodiment according to the present disclosure.

FIG. 11 is a flowchart in which a sample adjacent to a current block used to derive a linear model parameter for cross component prediction is constructed differently depending on whether the constraint intra prediction is performed, as embodiment according to the present disclosure.

FIG. 11 illustrates a flowchart of constructing a reference sample for deriving a linear model parameter for cross component prediction by reflecting whether constraint intra prediction proposed in the present disclosure is used (S1100).

If, as a result of the determination in step S1100, when constraint intra prediction is used, samples reconstructed in inter prediction mode among samples spatially adjacent to the current block are excluded in order to derive a linear model parameter for cross component prediction, and the reference sample is constructed only with samples reconstructed in the intra prediction mode (S1110), and the parameter of the linear model is derived.

On the other hand, as a result of the determination in step S1100, when constraint intra prediction is not used, the reference sample is constructed including all samples reconstructed in an intra prediction mode and an inter prediction mode among samples spatially adjacent to the current block in order to derive a linear model parameter for cross component prediction (S1120), and the parameter of the linear model is derived.

Figure 12:
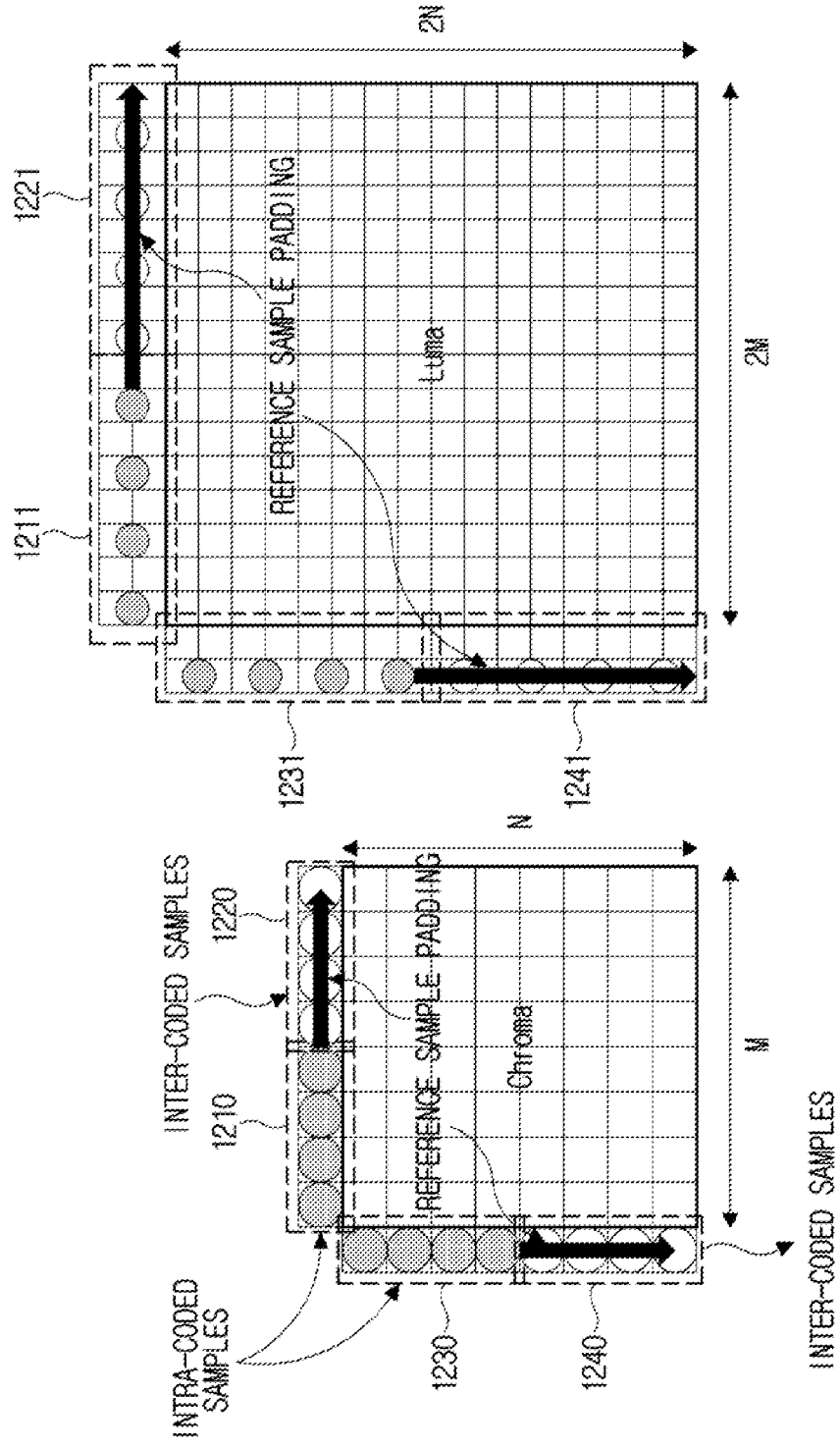
FIG. 12 illustrates an example of constructing a reference sample by padding an available sample among samples spatially adjacent to a current block used to derive a linear model parameter for cross component prediction according to the present disclosure.

FIG. 12 illustrates an example of constructing a reference sample by padding an available sample among samples spatially adjacent to a current block used to derive a linear model parameter for cross component prediction according to the present disclosure.

Specifically, FIG. 12 illustrates an example constructing a reference sample by padding an available sample among spatially adjacent samples in constructing a sample spatially adjacent to a target component block and a reference component block used to derive a linear model parameter for cross component prediction. Here, the linear model parameter for cross component prediction may be derived using the same method in the encoder and the decoder.

According to the embodiment of FIG. 12, in the present disclosure, a reference sample may be constructed excluding an unavailable sample among spatially adjacent samples of a reference component block, or a reference sample may be constructed by replacing an unavailable sample with an available sample. Specifically, in constructing a reference sample using samples spatially adjacent to the current block for cross component prediction in FIG. 12, a reference sample may be constructed by performing padding on the positions of the samples 1220, 1240, 1221, and 1241 reconstructed in the inter prediction mode using available samples 1210, 1230, 1211, and 1231 reconstructed in an intra prediction mode.

Figure 13:
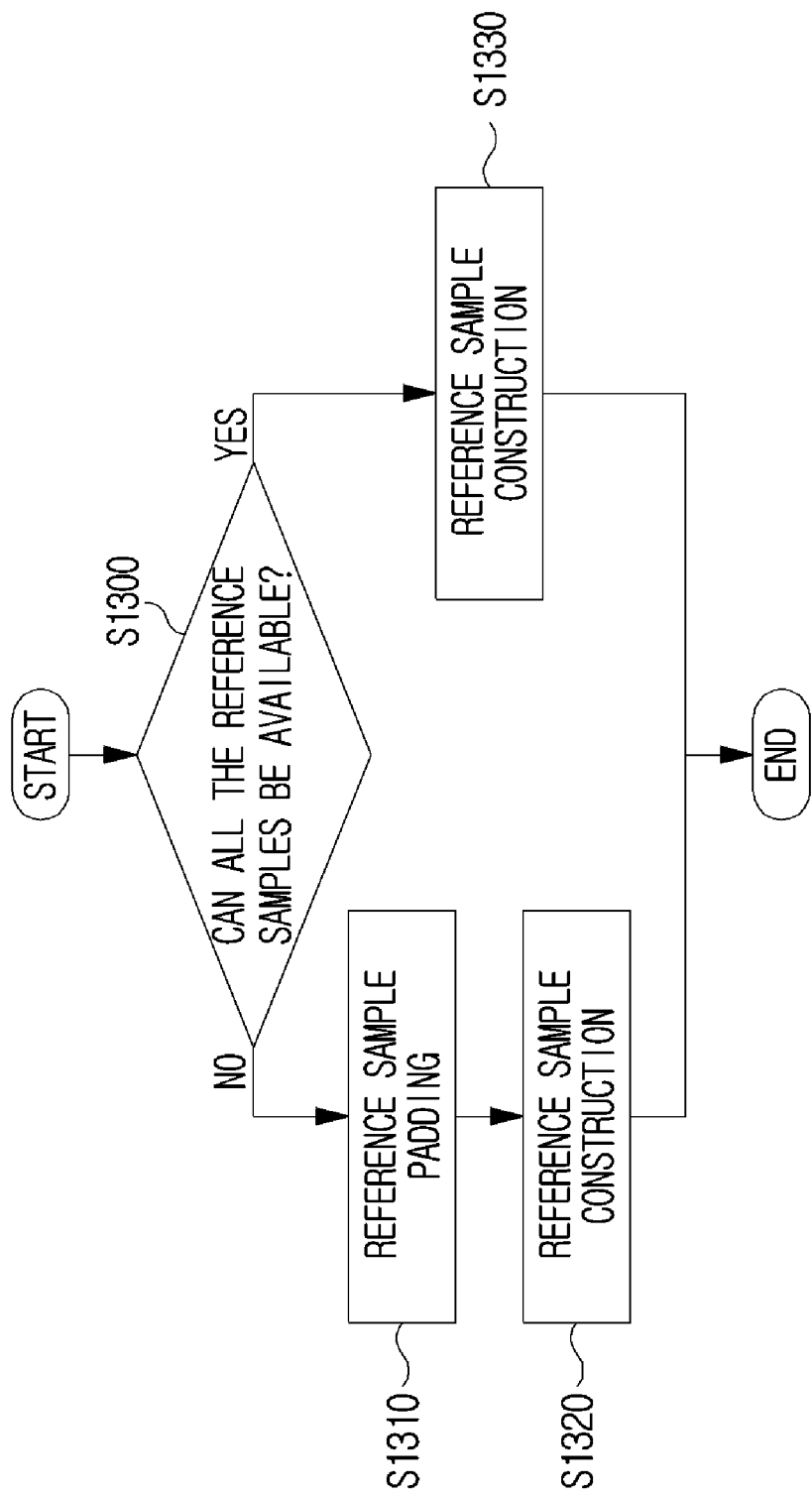
FIG. 13 is a flowchart of constructing a reference sample by padding available samples among samples spatially adjacent to a current block used to derive a linear model parameter for cross component prediction according to the present disclosure.

FIG. 13 is a flowchart of constructing a reference sample by padding available samples among samples spatially adjacent to a current block used to derive a linear model parameter for cross component prediction according to the present disclosure. That is, according to an embodiment of the present disclosure, a reference sample may be constructed by excluding an unavailable sample among samples spatially adjacent to a reference component block, or a reference sample may be constructed by replacing an unavailable sample with an available sample.

Referring to FIG. 13, it is first determined whether all adjacent samples may be used as reference samples (S1300). If, as a result of the determination in step S1300, all adjacent samples may be used as reference samples, the reference samples are constructed with the corresponding samples (S1330), and the parameter of the linear model is derived.

On the other hand, if, as a result of the determination in step S1300, it is not possible to use all adjacent samples as reference samples, first, padding is performed using an available sample (S1310) to construct the reference sample (S1320).

FIGS. 14 to 18 illustrate examples having different number and position of corresponding samples of a reference component corresponding to a current sample in cross component prediction respectively, as an embodiment according to the present disclosure.

Referring to FIGS. 14 to 18, it can be seen that the number and position of the corresponding samples of the reference component corresponding to the current sample may be made different by the cross component prediction method. Here, FIGS. 14 to 18 show an embodiment of the YUV 4:2:0 color format.

Figure 14:
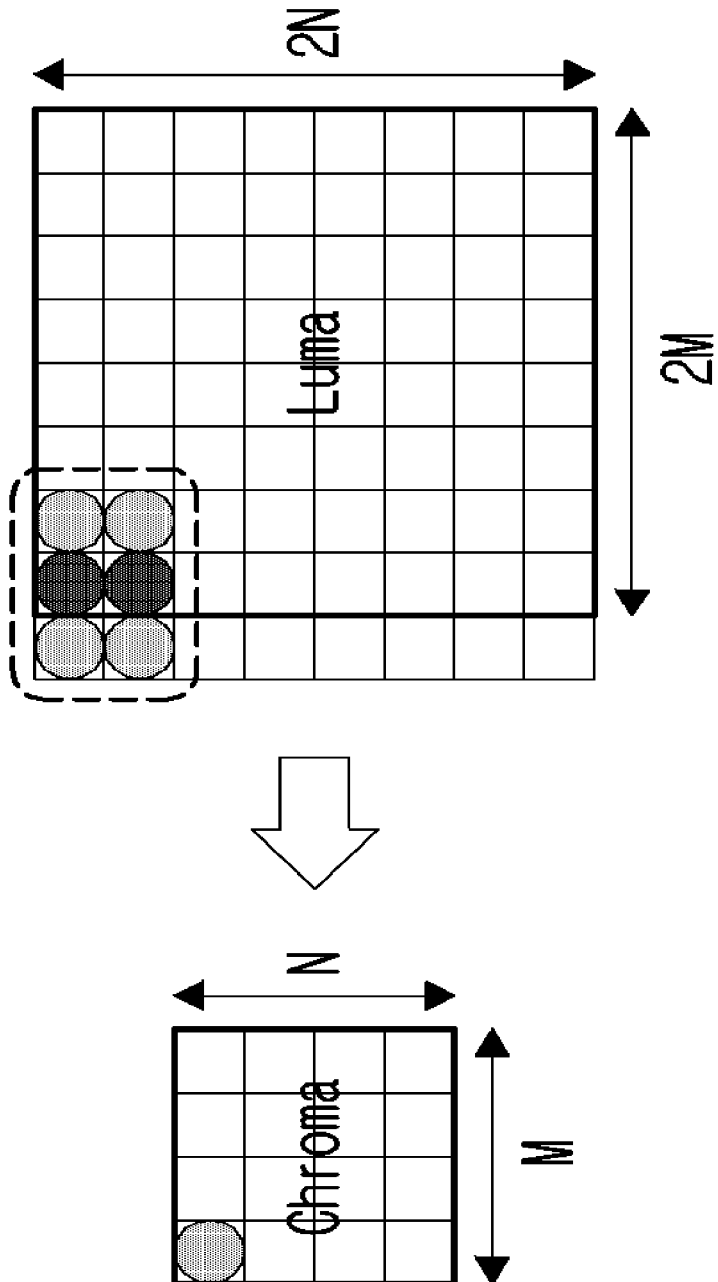
FIGS. 14 to 18 illustrate examples having different number and position of a corresponding sample of a reference component corresponding to a current sample in cross component prediction respectively, as an embodiment according to the present disclosure.

In particular, in the cross component prediction based on a linear model, the method of FIG. 14 may be basically used to determine the sample value of the luma component corresponding to a chroma component. In this case, FIG. 14 is a case in which four luma component samples and two adjacent samples are used, and the downsampling filter is as Equation 17 below.

$$Rec'_L[x,y]=(2*Rec_L[2x,2y]+2*Rec_L[2x,2y+1]+Rec_L[2x-1,2y]+Rec_L[2x+1,2y]+Rec_L[2x-1,2y+1]+Rec_L[2x+1,2y+1]+4)>>3 \quad \text{[Equation 17]}$$

Here, when the color format of the current picture is YUV 4:2:0, one of a plurality of corresponding methods for cross component prediction may be selectively used, and information for selecting one of the plurality of corresponding methods is directly signaled. Alternatively, one fixed corresponding method may be used according to the block size or shape.

Figure 15:
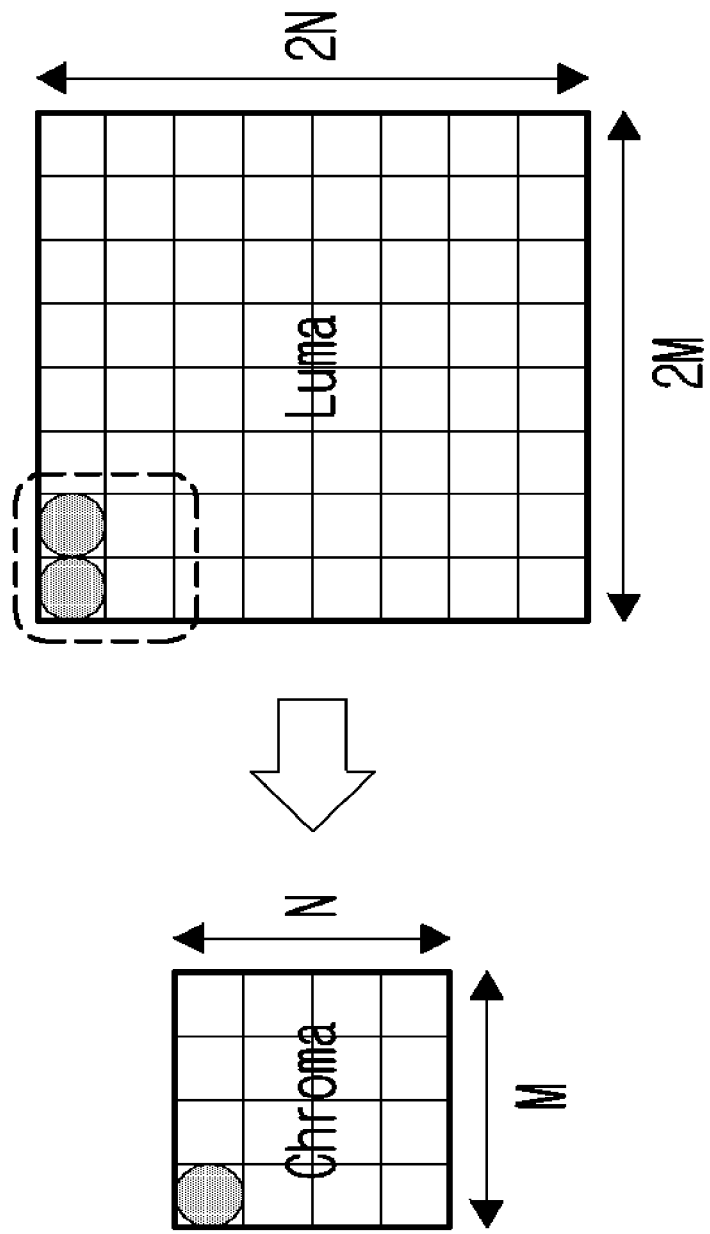

FIG. 15 shows another embodiment, in which two samples at the top-left of the luma component are used, and the downsampling filter is shown in Equation 18 below.

$$Rec'_L[x,y]=(Rec_L[2x,2y]+Rec_L[2x+1,2y]+1)>>1 \quad \text{[Equation 18]}$$

Figure 16:
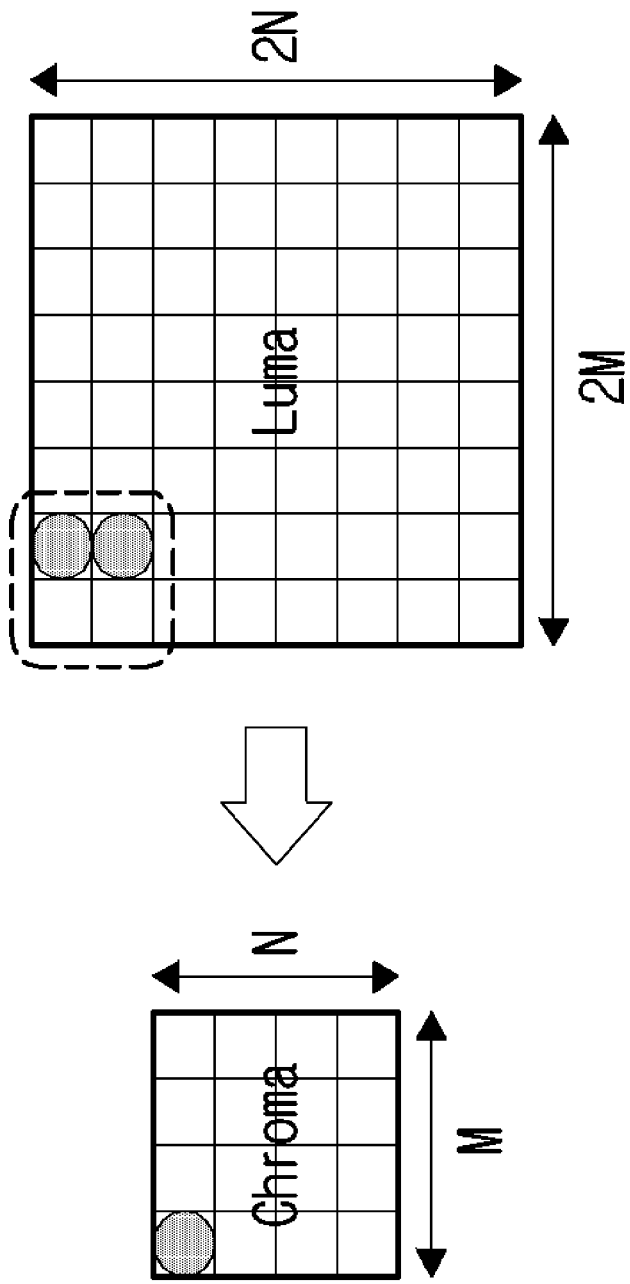

FIG. 16 shows another embodiment, in which the two top samples in the second left column of the luma component are used, and the downsampling filter is as Equation 19 below.

$$Rec'_L[x,y]=(Rec_L[2x+1,2y]+Rec_L[2x+1,2y+1]+1)>>1 \quad \text{[Equation 19]}$$

Figure 17:
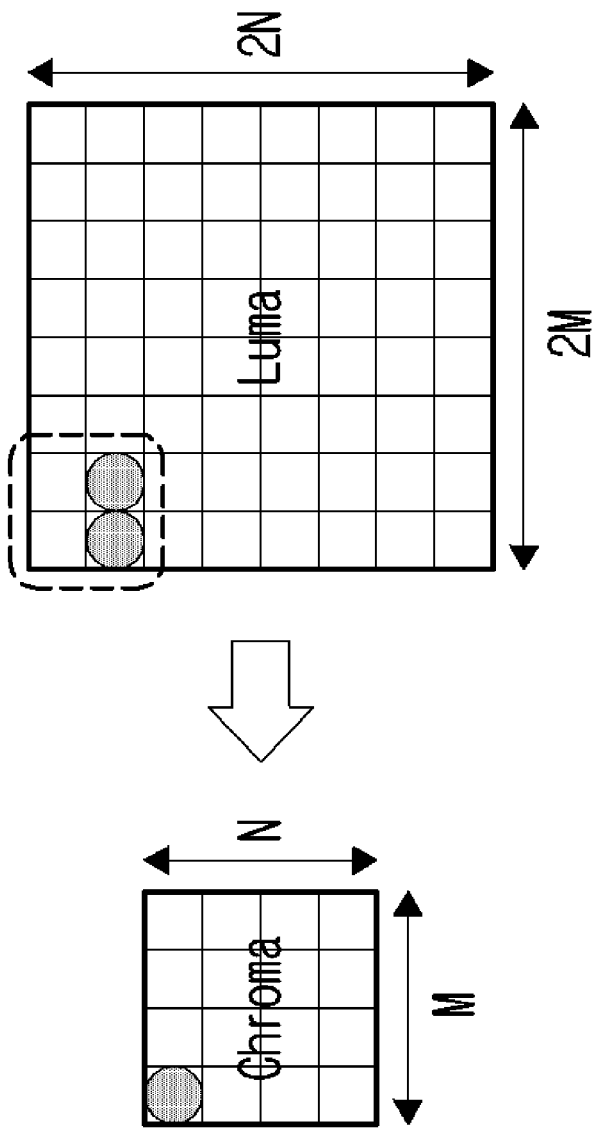

FIG. 17 illustrates another embodiment, in which two left samples in the second top line of the luma component are used, and the downsampling filter is as Equation 20 below.

$$Rec'_L[x,y]=(Rec_L[2x,2y+1]+Rec_L[2x+1,2y+1]+1)>>1 \quad \text{[Equation 20]}$$

In the case of performing downsampling as shown in FIG. 17, a parameter for cross component prediction is derived by constructing the reference sample of the luma component with not two lines, but one reference sample line.

Figure 18:
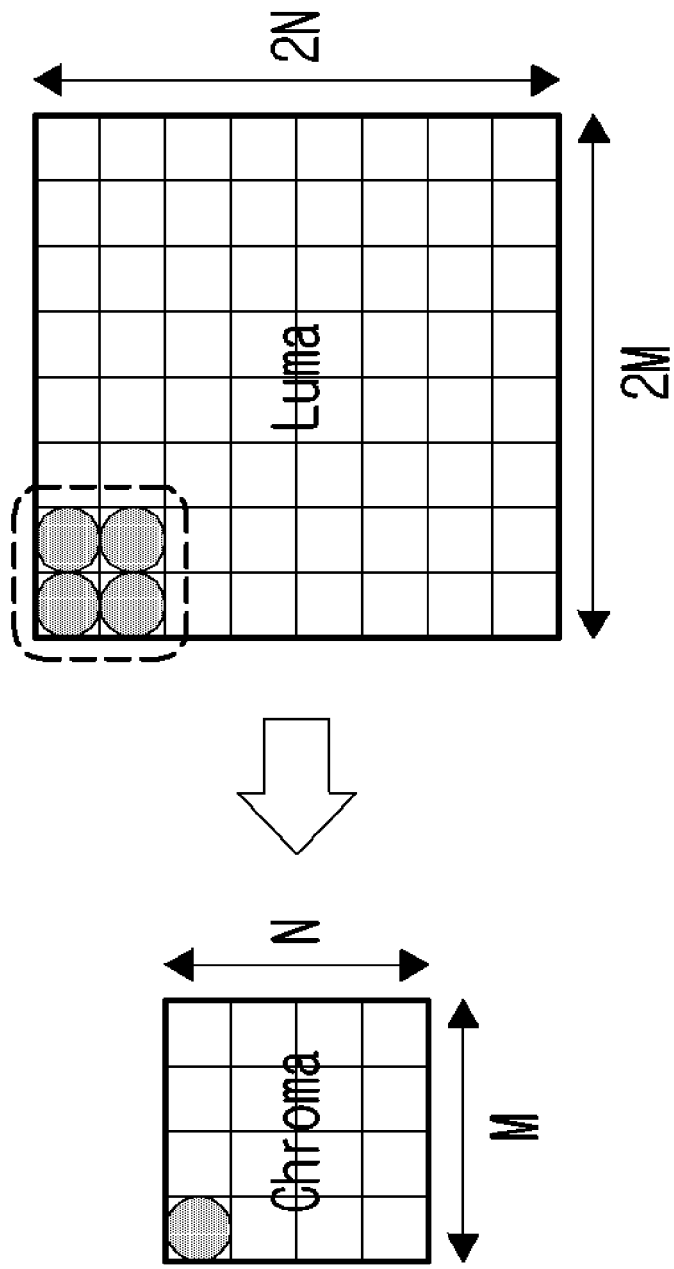

FIG. 18 shows another embodiment, in which four samples at the top-left of the luma component are used, and the downsampling filter is as Equation 21 below.

$$Rec'_L[x,y]=(Rec_L[2x,2y]+Rec_L[2x,2y+1]+Rec_L[2x+1,2y]+Rec_L[2x+1,2y+1]+2)>>2 \quad \text{[Equation 21]}$$

As another example, different from the illustrated embodiment of the YUV 4:2:0 color format, when using the YUV 4:2:2 color format, at least one of the methods other than the derivation method of FIG. 17 is used. In the case of using the YUV 4:4:4 color format, instead of the derivation method of FIGS. 14 to 18, it is possible to perform cross component prediction based on a linear model for a luma component that corresponds one-to-one to a chroma component.

As shown in Equation 1 of FIG. 3, a sample of a chroma component block may be predicted by applying a cross component prediction parameter to a sample of the luma component block. Here, the sample of the luma component block corresponds to the sample of the chroma component block, which may be downsampled according to a color format. The downsampling method may be selectively performed based on a predetermined flag, and will be described in detail below.

Embodiment 1

The downsampled sample pDsY[x][y] (x=0 . . . nTbW−1, y=0 . . . nTbH−1) of the luma component block may be derived based on the corresponding sample pY[2*x][2*y] of the luma component block and a neighboring sample. Here, the neighboring sample may mean a sample adjacent to at least one of the left, right, top, or bottom of the corresponding sample. For example, the sample pDsY[x][y] may be derived as in Equation 22 below.

$$pDsY[x][y]=(pY[2*x][2*y-1]+pY[2*x-1][2*y]+4*pY[2*x][2*y]+pY[2*x+1][2*y]+pY[2*x][2*y+1]+4)>>3 \quad \text{[Equation 22]}$$

However, there may be a case where the left/top neighboring regions of the luma component block are not available. If the left neighboring region of the luma component block is not available, the downsampled sample pDsY[0][y] (y=1 . . . nTbH−1) of the luma component block may be derived based on the corresponding sample pY[0][2*y] of the luma component block and a neighboring sample. The neighboring sample may mean a sample adjacent to at least one of the top or bottom of the corresponding sample. For example, the sample pDsY[0][y] (y=1 . . . nTbH−1) may be derived as in Equation 23 below.

$$pDsY[0][y]=(pY[0][2*y-1]+2*pY[0][2*y]+pY[0][2*y+1]+2)>>2 \quad \text{[Equation 23]}$$

When the top neighboring region of the luma component block is not available, the downsampled sample pDsY[x][0] (x=1 . . . nTbW−1) of the luma component block may be derived based on the corresponding sample pY[2*x][0] of the luma component block and a neighboring sample. The neighboring sample may mean a sample adjacent to at least one of the left or right of the corresponding sample. For example, the sample pDsY[x][0] (x=1 . . . nTbW−1) can be derived as in Equation 24 below.

$$pDsY[x][0]=(pY[2*x-1][0]+2*pY[2*x][0]+pY[2*x+1][0]+2)>>2 \quad \text{[Equation 24]}$$

Meanwhile, the downsampled sample pDsY[0][0] of the luma component block may be derived based on the corresponding sample pY[0][0] of the luma component block and/or a neighboring sample. The location of the neighboring samples may be determined differently according to availability of the left/top neighboring regions of the luma component block.

For example, when the left neighboring region is available and the top neighboring region is not available, pDsY[0][0] may be derived as in Equation 25 below.

$$pDsY[0][0]=(pY[-1][0]+2*pY[0][0]+pY[1][0]+2)>>2 \quad \text{[Equation 25]}$$

On the other hand, when the left neighboring region is not available and the top neighboring region is available, pDsY[0][0] may be derived as in Equation 26 below.

$$pDsY[0][0]=(pY[0][-1]+2*pY[0][0]+pY[0][1]+2)>>2 \quad \text{[Equation 26]}$$

Meanwhile, when both the left and top neighboring regions are not available, pDsY[0][0] may be set as the corresponding sample pY[0][0] of the luma block.

Embodiment 2

The sample downsampled pDsY[x][y] (x=0 . . . nTbW−1, y=0 . . . nTbH−1) of the luma component block is derived based on the corresponding sample pY[2*x][2*y] of the luma component block and a neighboring sample. The neighboring sample may mean a sample adjacent to at least one of the bottom, left, right, bottom-left, or bottom-right of the corresponding sample. For example, the sample pDsY[x][y] may be derived as in Equation 27 below.

$$pDsY[x][y]=(pY[2*x-1][2*y]+pY[2*x-1][2*y+1]+2*pY[2*x][2*y]+2*pY[2*x][2*y+1]+pY[2*x+1][2*y]+pY[2*x+1][2*y+1]+4)>>3 \quad \text{[Equation 27]}$$

However, when the left neighboring region of the luma component block is not available, the downsampled sample pDsY[0][y] (y=0 . . . nTbH−1) of the luma component block may be derived based on the corresponding sample pY[0][2*y] of the luma component block and the bottom neighboring sample. For example, the sample pDsY[0][y] (y=0 . . . nTbH−1) can be derived as in Equation 28 below.

$$pDsY[0][y]=(pY[0][2*y]+pY[0][2*y+1]+1)>>1 \quad \text{[Equation 28]}$$

Downsampling of the luma component block may be performed based on any one of Embodiments 1 and 2 described above. In this case, one of the first or second embodiments may be selected based on a predetermined flag. The flag may indicate whether the downsampled luma sample has the same position as the original luma sample. For example, when the flag is the first value, the downsampled luma sample has the same position as the original luma sample. On the other hand, when the flag is the second value, the downsampled luma sample has the same position in the horizontal direction as the original luma sample, but has a position shifted by a half pel in the vertical direction.

Figure 19:
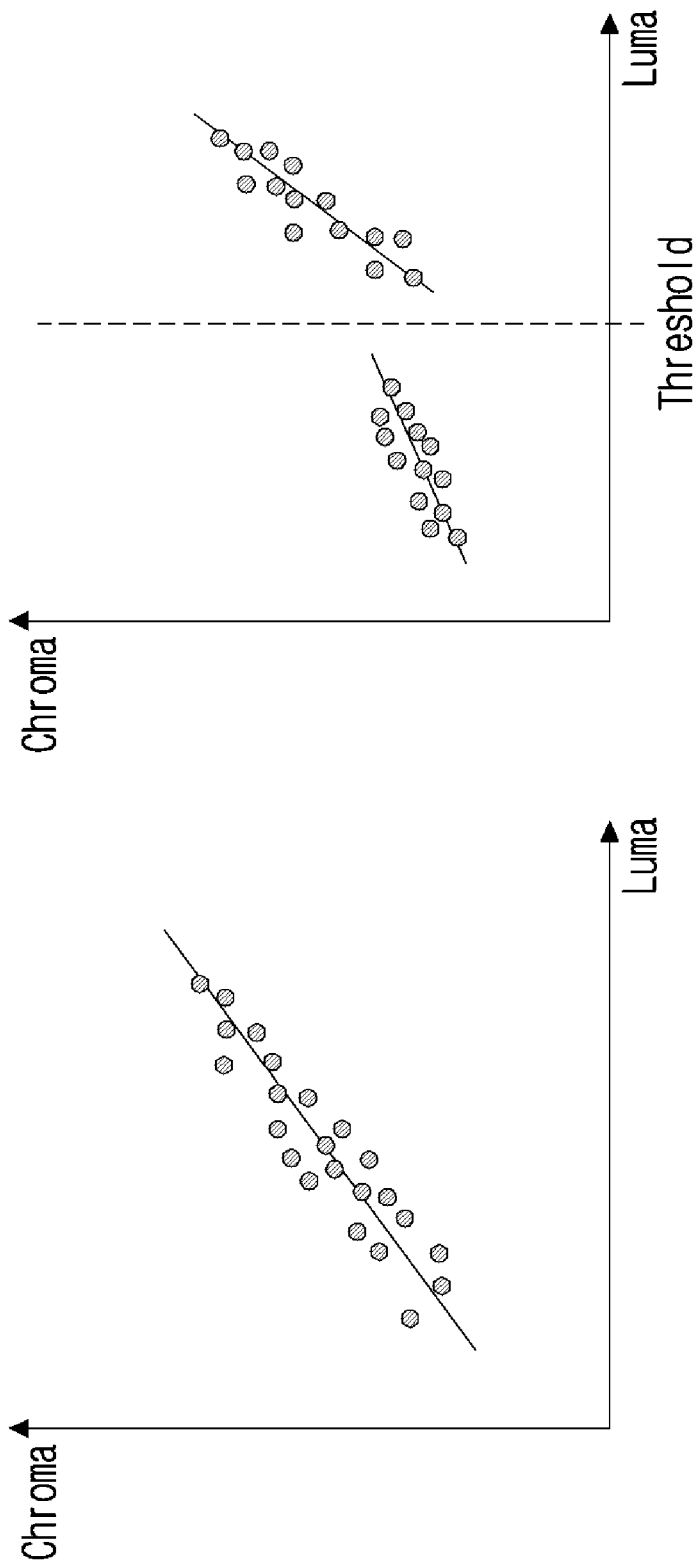
FIG. 19 is a diagram illustrating a concept of a method of performing cross component prediction using a plurality of linear models as an embodiment according to the present disclosure.

FIG. 19 is a diagram illustrating a concept of a method of performing cross component prediction using a plurality of linear models as an embodiment according to the present disclosure.

Specifically, FIG. 19 shows the concept of a method of performing cross component prediction using one or more linear models in deriving a linear model parameter for cross component prediction using the same method in an encoder and a decoder.

For example, as shown in the left figure of FIG. 19, the distribution of sample values between two different components may be used to represent a single linear model, and cross component prediction may be performed based on the corresponding linear model.

In addition, as shown in the right figure of FIG. 19, the distribution of pixel values between two different components may be used to represent one or more linear models, and cross component prediction may be performed based on different linear models according to the range of sample values.

Various embodiments of the present disclosure are not listed in all possible combinations, but are intended to describe representative aspects of the present disclosure, and matters described in the various embodiments may be applied independently or may be applied in combination of two or more.

In addition, various embodiments of the present disclosure may be implemented by hardware, firmware, software, or a combination thereof. For implementation by hardware, it may be implemented by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), general processor (general processor), a controller, a microcontroller, a microprocessor, or etc.

The scope of the present disclosure includes software or machine-executable instructions (e.g., operating systems, applications, firmware, programs, etc.) that allow an operation according to a method of various embodiments to be executed on a device or computer, and a non-transitory computer-readable medium (non-transitory computer-readable medium) which stores such software or instructions and etc and is executable on a device or a computer.

INDUSTRIAL APPLICABILITY

The present disclosure may be used to encode/decode video signal.

The invention claimed is:

1. A method of decoding an image, comprising:
   obtaining, from a bitstream, information on an intra prediction mode of a chroma component block in the image;
   constructing reference samples for cross component prediction of the chroma component block;
   deriving a cross component prediction parameter using at least one of the reference samples;
   generating a prediction sample of the chroma component block by performing the cross component prediction of the chroma component block based on a luma component block corresponding to the chroma component block and the cross component prediction parameter; and
   reconstructing the chroma component block based on the prediction sample,
   wherein the reference samples for the cross component prediction include at least one of left reference samples or top reference samples,
   wherein the left reference samples for the cross component prediction include at least one of a first sample belonging to a left neighboring block of the luma component block or a second sample belonging to a bottom-left neighboring block of the luma component block,
   wherein the top reference samples for the cross component prediction include at least one of a third sample belonging to a top neighboring block of the luma component block or a fourth sample belonging to a top-right neighboring block of the luma component block,
   wherein the reference samples for the cross component prediction are variably constructed based on the intra prediction mode of the chroma component block,
   wherein, in response to the intra prediction mode being equal to a first mode, the cross component prediction parameter is derived using only the left reference samples, and
   wherein, in response to the intra prediction mode being equal to a second mode, the cross component prediction parameter is derived using only the top reference samples.

2. The method of claim 1, wherein the reference samples for the cross component prediction are variably constructed based on comparison of a width and a height of the chroma component block.

3. A method of encoding an image, comprising:
   determining an intra prediction mode of a chroma component block in the image;
   constructing reference samples for cross component prediction of the chroma component block;
   deriving a cross component prediction parameter using at least one of the reference samples;
   generating a prediction sample of the chroma component block by performing the cross component prediction of the chroma component block based on a luma component block corresponding to the chroma component block and the cross component prediction parameter;
   deriving a residual sample of the chroma component block based on the prediction sample; and
   encoding the residual sample of the chroma component block,
   wherein information on the intra prediction mode of the chroma component block is encoded into a bitstream,
   wherein the reference samples for the cross component prediction include at least one of left reference samples or top reference samples,
   wherein the left reference samples for the cross component prediction include at least one of a first sample belonging to a left neighboring block of the luma component block or a second sample belonging to a bottom-left neighboring block of the luma component block,
   wherein the top reference samples for the cross component prediction include at least one of a third sample belonging to a top neighboring block of the luma component block or a fourth sample belonging to a top-right neighboring block of the luma component block,
   wherein the reference samples for the cross component prediction are variably constructed based on the intra prediction mode of the chroma component block,
   wherein, in response to the intra prediction mode being equal to a first mode, the cross component prediction parameter is derived using only the left reference samples, and
   wherein, in response to the intra prediction mode being equal to a second mode, the cross component prediction parameter is derived using only the top reference samples.

4. A method of transmitting a bitstream for an image, comprising:
   determining an intra prediction mode of a chroma component block in the image;
   constructing reference samples for cross component prediction of the chroma component block;
   deriving a cross component prediction parameter using at least one of the reference samples;
   generating a prediction sample of the chroma component block by performing the cross component prediction of the chroma component block based on a luma component block corresponding to the chroma component block and the cross component prediction parameter;
   deriving a residual sample of the chroma component block based on the prediction sample;
   encoding the residual sample of the chroma component block to generate a the bitstream; and
   transmitting the bitstream,
   wherein the bitstream includes information on the intra prediction mode of the chroma component block,
   wherein the reference samples for the cross component prediction include at least one of left reference samples or top reference samples,
   wherein the left reference samples for the cross component prediction include at least one of a first sample belonging to a left neighboring block of the luma component block or a second sample belonging to a bottom-left neighboring block of the luma component block,
   wherein the top reference samples for the cross component prediction include at least one of a third sample belonging to a top neighboring block of the luma component block or a fourth sample belonging to a top-right neighboring block of the luma component block,
   wherein the reference samples for the cross component prediction are variably constructed based on the intra prediction mode of the chroma component block, wherein, in response to the intra prediction mode being equal to a first mode, the cross component prediction parameter is derived using only the left reference samples, and wherein, in response to the intra prediction mode being equal to a second mode, the cross component prediction parameter is derived using only the top reference samples.

* * * * *